US006718001B2

(12) United States Patent
Hidaka et al.

(10) Patent No.: US 6,718,001 B2
(45) Date of Patent: Apr. 6, 2004

(54) NUCLEAR REACTOR

(75) Inventors: Masataka Hidaka, Hitachi (JP);
Tadashi Fujii, Hitachinaka (JP);
Masaya Ohtsuka, Mito (JP); Naoyuki Yamada, Hitachinaka (JP); Junichi Yamashita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/942,945

(22) Filed: Aug. 31, 2001

(65) Prior Publication Data

US 2002/0122526 A1 Sep. 5, 2002

(30) Foreign Application Priority Data

Nov. 15, 2000 (JP) .......................... 2000-352543

(51) Int. Cl.[7] .................... G21C 9/00; G21C 15/00
(52) U.S. Cl. .................... 376/283; 376/298; 376/299; 376/406
(58) Field of Search ................ 376/283, 298, 376/299, 406

(56) References Cited

U.S. PATENT DOCUMENTS

| 4,051,892 A | * | 10/1977 | Reinsch ................... 165/107 |
| 4,643,871 A | * | 2/1987 | Fajeau ..................... 376/282 |
| 4,783,306 A | * | 11/1988 | Vecsey et al. ............. 376/213 |
| 5,008,069 A | * | 4/1991 | Fredell .................... 376/299 |
| 5,096,659 A | * | 3/1992 | Hidaka et al. ............. 376/283 |
| 5,102,616 A | * | 4/1992 | Gardner et al. ............ 376/282 |
| 5,282,230 A | * | 1/1994 | Billig et al. .............. 376/283 |
| 5,511,102 A | * | 4/1996 | Gluntz ..................... 376/283 |
| 5,661,770 A | * | 8/1997 | Spinks ..................... 376/298 |
| 5,694,442 A | * | 12/1997 | Cinotti et al. ............. 376/298 |
| 5,825,838 A | * | 10/1998 | Park et al. ................ 376/299 |
| 5,887,043 A | * | 3/1999 | Spinks ..................... 376/298 |
| 5,896,431 A | * | 4/1999 | Cheung .................... 376/283 |
| 6,069,930 A | * | 5/2000 | Gamble et al. ............. 376/282 |
| 6,243,432 B1 | * | 6/2001 | Cheung et al. ............. 376/283 |

FOREIGN PATENT DOCUMENTS

| JP | 58-156888 | 9/1983 | .................. 376/283 |
| JP | 60-135890 | 7/1985 | .................. 376/283 |
| JP | 1-172800 | 7/1989 | .................. 376/283 |
| JP | 03-214098 | * 9/1991 | .................. 376/299 |
| JP | 2000-221291 | 8/2000 | .................. 376/283 |

* cited by examiner

*Primary Examiner*—Jack Keith
(74) *Attorney, Agent, or Firm*—Crowell & Moring LLP

(57) ABSTRACT

In an indirect cycle nuclear reactor, a size of the reactor containment vessel is decreased by removing decay heat inside the reactor pressure vessel without using any active component to improve the economic feasibility. A main steam pipe communicating with a heat exchanger of the indirect cycle nuclear reactor is branched in a position upstream of a main steam isolation valve to connect the branched pipe to a heat exchanger in a pressure suppression pool through an isolation valve. A feed water pipe is also branched in a position upstream of an isolation valve to connect the branched pipe to the heat exchanger through the isolation valve. Decay heat is dissipated from the heat exchanger into the pressure suppression pool, and condensed water condensed by heat dissipation is returned to the heat exchanger to cool the inside of the pressure vessel. Heat in the pressure suppression pool is transferred from a condensing type heat exchanger to a heat dissipater outside a containment vessel to be dissipated to the outside of the containment vessel.

6 Claims, 13 Drawing Sheets

← FLOW OF PRIMARY COOLING WATER
◄----- FLOW OF PRIMARY STEAM
← FLOW OF SECODARY COOLING WATER
◄----- FLOW OF SECONDARY STEAM

⟵ FLOW OF PRIMARY COOLING WATER
⟵----- FLOW OF PRIMARY STEAM
⟵ FLOW OF SECODARY COOLING WATER
⟵----- FLOW OF SECONDARY STEAM

← FLOW OF PRIMARY COOLING WATER
←------ FLOW OF PRIMARY STEAM
⬅ FLOW OF SECODARY COOLING WATER
⬅------ FLOW OF SECONDARY STEAM

← FLOW OF PRIMARY COOLING WATER
←----- FLOW OF PRIMARY STEAM
⬅ FLOW OF SECODARY COOLING WATER
⬅----- FLOW OF SECONDARY STEAM

← FLOW OF PRIMARY COOLING WATER
←------ FLOW OF PRIMARY STEAM
⬅ FLOW OF SECODARY COOLING WATER
⬅------ FLOW OF SECONDARY STEAM

← FLOW OF PRIMARY COOLING WATER
←----- FLOW OF PRIMARY STEAM
⬅ FLOW OF SECODARY COOLING WATER
⬅----- FLOW OF SECONDARY STEAM

← FLOW OF PRIMARY COOLING WATER
←------ FLOW OF PRIMARY STEAM
◄— FLOW OF SECODARY COOLING WATER
◄----- FLOW OF SECONDARY STEAM

← FLOW OF PRIMARY COOLING WATER
←----- FLOW OF PRIMARY STEAM
⬅ FLOW OF SECODARY COOLING WATER
⬅----- FLOW OF SECONDARY STEAM

NUCLEAR REACTOR

BACKGROUND OF THE INVENTION

1. Field of the Invention

The present invention relates to a nuclear reactor in which heat generated by nuclear fission in the reactor core is used, and particularly to a nuclear reactor of an indirect cycle type in which heat of the primary system of the nuclear reactor is used outside the pressure vessel using a heat exchanger.

2. Prior Art

An example of a system for removing decay heat generated in the reactor core during reactor shutdown is a residual heat removal system described, for example, in "A Textbook of Nuclear Power Generation Technology (Ohm Publication Co.)" PP. 172. This is a system for removing decay heat after lowering temperature of the primary system using the main condenser, and performs heat removal by a heat exchanger outside the containment vessel using the reactor water recirculation pump. Further, a reactor core isolation cooling system is provided in order to cope with a case of occurrence of a failure in the main condenser or the like. Steam generated by the decay heat in the reactor core is released to the pressure suppression pool through a relief valve, and a pump driven by a steam turbine makes up for lowering of water surface level in the pressure vessel by supplying water in a condensate storage tank into the pressure vessel.

As a second example, in regard to the system removing decay heat generated in the reactor core during reactor shutdown in the nuclear reactor in which heat of the primary system of the nuclear reactor is used outside the pressure vessel using a heat exchanger, a decay heat removal system is disclosed, for example, in Japanese Patent Application Laid-Open No.1-172800.

The system is that decay heat is heat-exchanged by a secondary system heat exchanger inside the pressure vessel, and the decay heat removed by conducting generated steam to heat pipes arranged in pool water outside the containment vessel to be condensed.

On the other hand, as a third example, in regard to the nuclear reactor in which heat of the nuclear reactor primary system generated in the reactor core is used outside the pressure vessel using a heat exchanger, a natural circulation nuclear reactor is disclosed, for example, in Japanese Patent Application Laid-Open No.58-156888. The nuclear reactor is a system that heat exchangers are arranged above the water surface level and below the water surface level inside the pressure vessel, and the heat exchanger above the water surface level conducts heat to the secondary cooling water mainly by condensation of the primary cooling water vapor, and the heat exchanger below the water surface level conducts heat to the secondary cooling water by convection heat transfer of the primary cooling water.

The heat exchanger below the water surface level is also used for controlling a subcooling degree of the primary cooling water flowing into the reactor core. The secondary cooling water lowing into and out of the heat exchanger communicates with the outside of the pressure vessel through a flow passage penetrating through the side wall surface of the pressure vessel.

As a fourth example, a natural circulation nuclear reactor is disclosed in Japanese Patent Application Laid-Open No.60-135890. The nuclear reactor is a system that a cylindrical baffle having a cross section wider then a shroud is arranged in an upper portion of the shroud to prevent the water surface level from swilling up due to jet flow and to prevent condensing heat transfer of a heat exchanger from being lowered by direct contact of the cooling water to the heat exchanger.

As a fifth example, a heat supplying nuclear reactor is disclosed in Patent Application Laid-Open No.2000-221291. The nuclear reactor is a system that a plate-shaped baffle plate is arranged in a portion of the shroud to prevent condensing heat transfer of a heat exchanger from being lowered by direct contact of the cooling water to the heat exchanger.

In the example of the system described in "A Textbook of Nuclear Power Generation Technology", the first edition, the fourth print, page 172 to page 173, published on May 20, 1972 by Ohm Publication Co., there is a problem in that the economic feasibility in relation to construction of the nuclear reactor is decreased because the system composed of active components for removing decay heat needs to be routed to the outside of the containment vessel.

Further, in the indirect cycle nuclear reactor, a system for cooling the primary system and for preventing the primary system cooling water from flowing out to the inside of the containment vessel is important when the main condenser can not be used. In the example shown in the Japanese Patent Application Laid-Open No.1-172800, there is a problem in that the economic feasibility in relation to construction of the nuclear reactor is decreased because the system for removing decay heat needs to be routed to the outside of the containment vessel.

Further, in the example shown in Japanese Patent Application Laid-Open No.58-156888, because opening portions such as nozzles are arranged at portions below the water surface level in the pressure vessel, there is a possibility that the primary cooling water may flow out in an event of occurrence of a rupture in the opening portion though it hardly occurs.

Therefore, it is necessary to provide a safety system in considering the event that the primary cooling water may flow out. Further, when the heat exchanger is taken off at maintenance of the pressure vessel, it is required that the heat exchanger is taken off from the pressure vessel wall after removing the upper vessel head of the pressure vessel, and then the heat exchanger is pulled upward.

In the examples shown in Japanese Patent Application Laid-Open No.60-135890 and Patent Application Laid-Open No.2000-221291, the heat transfer area of the heat exchange is limited because the plenum portion in the outer side of the baffle plate where the heat exchanger is contained is narrow. Therefore, it is necessary to make the heat exchanger tall on order to secure a designed output power. Accordingly, there is a problem in that the economic feasibility in relation to construction of the nuclear reactor is decreased because a height of the pressure vessel and a height of the containment vessel become higher.

SUMMARY OF THE INVENTION

A first object of the present invention is to provide a highly safe nuclear reactor in which the primary system cooling water never leaks to the outside of the containment vessel at occurrence of such a failure that the main condenser can not be used, or at occurrence of a failure or a rupture in the heat exchanger.

A second object of the present invention is to provide a highly safe nuclear reactor which has a low possibility of leaking the primary system cooling water, and the highly safe nuclear reactor is also easy in manipulability at maintenance of the pressure vessel.

A third object of the present invention is to provide a highly economical nuclear reactor of which the reactor pressure vessel and the containment vessel are small in size.

A fourth object of the present invention is to provide a highly economical nuclear reactor of which the thermal output of the nuclear core is high, and the highly economical nuclear reactor is also high in operability.

A fifth object of the present invention is to provide a highly economical nuclear reactor of which the thermal output of the nuclear core is further increased.

The first object described above can be attained by a nuclear reactor comprising a heat exchanger arranged in a pressure vessel, the heat exchanger being heated by primary cooling water heated by a reactor core to generate steam to be supplied to a turbine or a heat supply system; and a heat exchanger arranged under water of a pressure suppression pool in a containment vessel, wherein a secondary steam flow passage of the heat exchanger inside the pressure vessel is branched, the branched pipe communicating with the heat exchanger inside the pressure suppression pool through an isolation valve; a secondary cooling water flow passage of the eat exchanger inside the pressure vessel being branched, the branched pipe communicating with the heat exchanger inside the pressure suppression pool through an isolation valve; decay heat generated in the reactor core during reactor core isolation being heat exchanged by the heat exchanger inside the pressure vessel, steam generated by the decay heat being condensed by the heat exchanger inside the pressure suppression pool, at the same time the condensed water being supplied to the heat exchanger inside the pressure vessel.

The second object described above can be attained by a nuclear reactor comprising a heat exchanger arranged in a pressure vessel, the heat exchanger being heated by primary cooling water heated by a reactor core to generate steam to be supplied to a turbine or a heat supply system, flow passages of secondary steam generated in the heat exchanger and secondary cooling water supplied to the heat exchanger being inserted from the head portion of the pressure vessel, at the same time the heat exchanger being placed at a level above the water surface level inside the pressure vessel, steam of the primary cooling water being condensed to transfer the heat to the secondary cooling water in the heat exchanger, the heat exchanger being supported together with control rod drive shafts by the head of the pressure vessel.

The third object described above can be attained by a nuclear reactor comprising an annular baffle plate arranged above a shroud, the annular baffle plate having a flow passage cross-sectional area smaller than that of the shroud; a heat exchanger arranged outside the baffle plate inside the pressure vessel; and a gap formed between an upper portion of the shroud and the baffle plate. Further, the third object described above can be attained by a nuclear reactor, wherein one or more baffle plates are arranged inside the baffle plate so as to intersect at right angle with flow direction of two-phase cooling water flowing from the inside of the shroud into the baffle plate, and a plurality of flow-passage holes are formed in the baffle plates intersecting at right angle with the flow direction of two-phase cooling water. Furthermore, the third object described above can be attained by a nuclear reactor, wherein in a case of arranging a plurality of the baffle plates intersecting at right angle with the flow direction of two-phase cooling water, the plurality of flow-passage holes on the baffle plates intersecting at right angle with the flow direction of two-phase cooling water are formed by varying positions for each of the baffle plates intersecting at right angle so as to improve stem separation effect by varying direction of the two-phase cooling water flowing into the baffle plate from the inside of the shroud between the baffle plates intersecting at right angle with the flow direction of two-phase cooling water.

The fourth object described above can be attained by a nuclear reactor comprising a heat exchanger or a superheater arranged inside the baffle plate in the pressure vessel, the heat exchanger being heated by primary cooling water heated in the reactor core and generating steam, the superheater superheating the steam of secondary cooling water generated in the heat exchanger, the generated steam of the superheated steam being supplied to a turbine or a heat supply system; and a preheater for the secondary cooling water arranged inside the downcomer.

The fifth object described above can be attained by a nuclear reactor comprising the plurality of the baffle plates intersecting at right angle with the flow direction of two-phase cooling water, flow-passage holes being formed on each of the baffle plates intersecting at right angle with the flow direction of two-phase cooling water, the plurality of flow-passage holes being formed so as to vary positions for each of the baffle plates intersecting at right angle.

DESCRIPTION OF THE PREFERRED EMBODIMENTS

Figure 1:
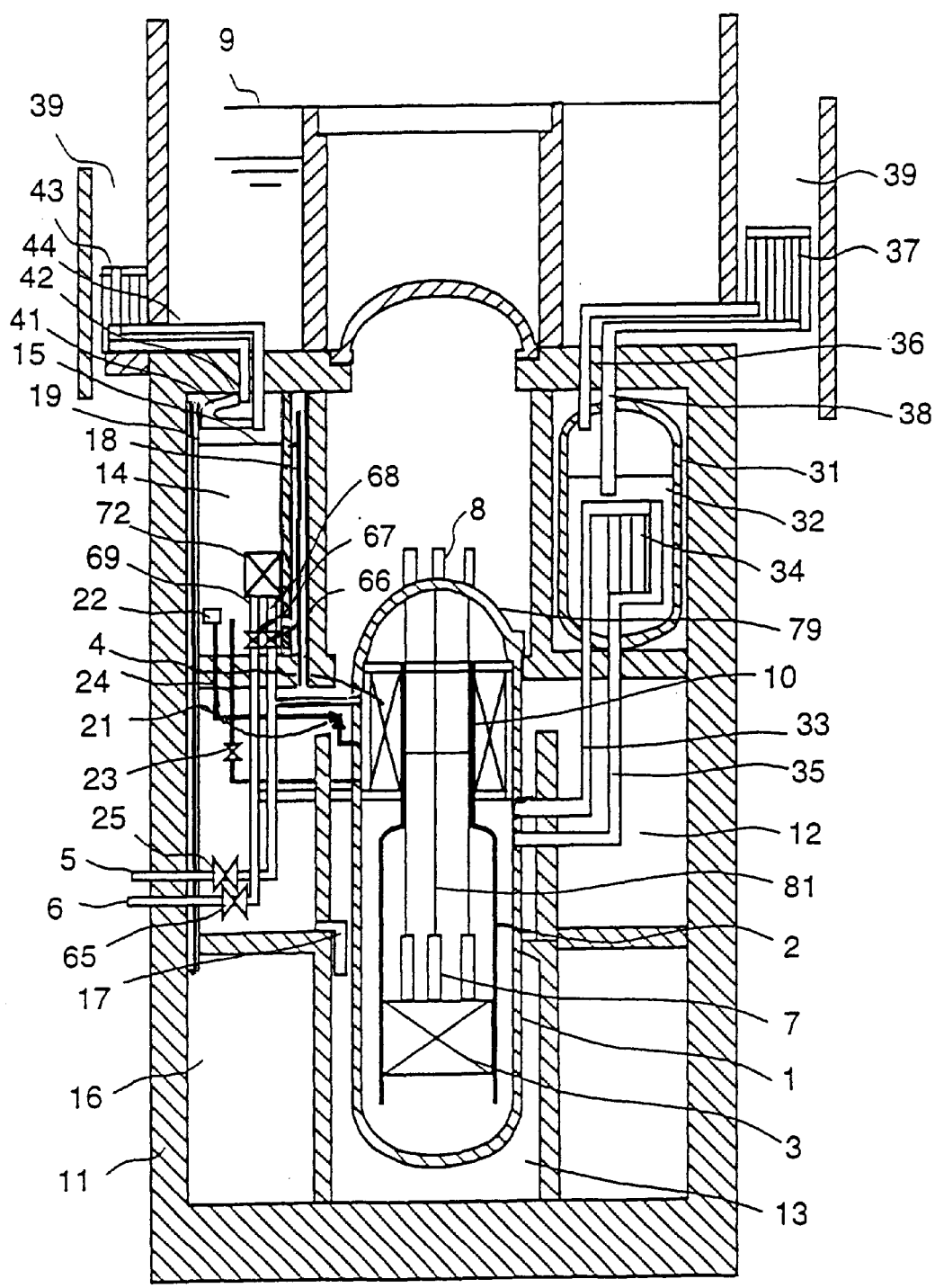
FIG. 1 is a vertical cross-sectional view showing a first embodiment of a reactor containment vessel in accordance with the present invention.
Figure 2:
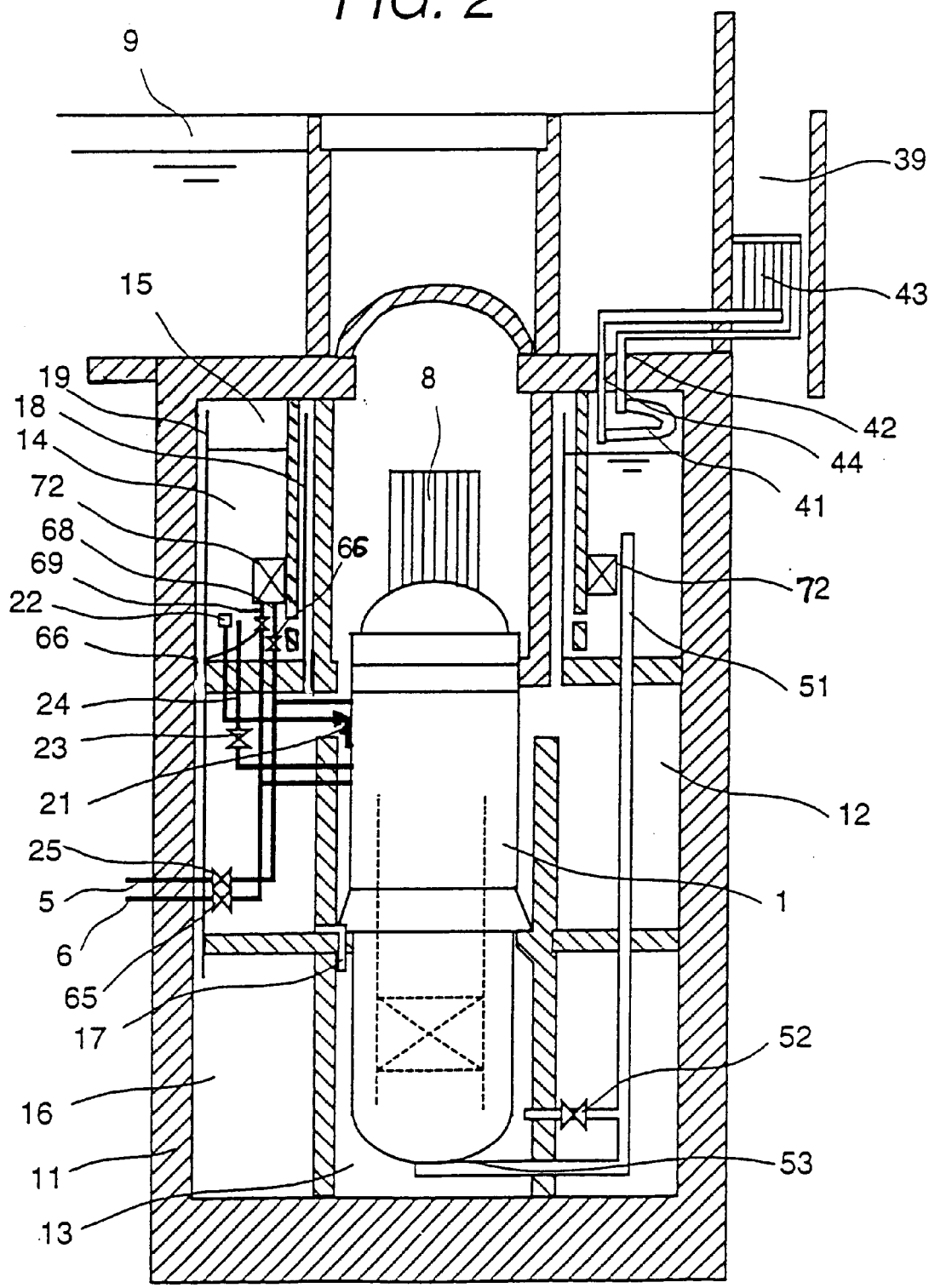
FIG. 2 is a vertical cross-sectional view showing the first embodiment of the reactor containment vessel of FIG. 1 being taken in another cross-sectional plane.

A preferred embodiment of a nuclear reactor in accordance with the present invention will be described below. FIG. 1 and FIG. 2 are vertical cross-sectional views showing reactor containment vessels to which the first embodiment is applied. A pressure vessel 1 containing a reactor core 3 constructed of nuclear fuel, a shroud 2 and control rods 7 is contained in a containment vessel 11. The containment vessel 11 is composed of a drywell 12 to install the pressure vessel 1 therein; a pressure suppression pool 14 for suppressing pressure of the containment vessel 11 by condensing steam through vent pipes 18 in an event of a reactor accident such as occurrence of rupture in a main steam pipe 5; and a wetwell 16 communicating with an upper plenum 15 of the pressure suppression pool 14 through a communicating pipe 19. By arranging a pipe having an automatic depressurizing valve 21 between the inside of the pressure vessel 1 and a quencher 22, steam inside the pressure vessel 1 can be discharged to the pressure suppression pool 14 through the quencher 22. The containment vessel 11 made of reinforced concrete except a region installing the pressure vessel 1 is vertically partitioned into three compartments, the pressure suppression pool 14 having cooling water being formed in the upper compartment, the drywell 12 for arranging components such as the main steam pipe 5 and so on being formed in the middle compartment, the wetwell 16 of pressure suppression space being formed in the lower compartment, the drywall 12 communicating with the pressure suppression pool 14 through the plurality of vent pipes 18. Further, a plurality of gravitationally flow-down water injection pipes 24 having an isolation valve 23 are arranged between the pressure vessel 1 and the pressure suppression pool 14. A cooling vessel 31 filled with a coolant is arranged inside the containment vessel 11 in a position at a level higher than that of the reactor core 3 inside the pressure vessel 1, and a heat exchanger 34 is arranged in a position at a level lower than the liquid surface level of the cooling vessel 31, and the heat exchanger 34 communicates with an inside portion of the pressure vessel 1 at a level lower than the water surface level in the pressure vessel during normal operation through a pressure vessel water injection pipe 35 and an inflow pipe 33. A heat dissipater 37 is arranged in a position at a level higher than that of the cooling vessel 31 and inside a ventilation duct 39 outside the reactor building, and the heat dissipater 37 communicates with the upper portion of the cooling vessel 31 through a gas inflow pipe 36, and the heat dissipater 37 communicates with the inside of the cooling vessel 37 through a liquid returning pipe 38.

Further, a heat-pipe type containment vessel cooling system is constructed by arranging a condensing type heat exchanger 41 filled with a heat medium in an upper plenum 15 of the pressure suppression pool 14 and a heat dissipater 43 at a level higher than that of the condensing type heat exchanger 41 in the ventilation duct 39 outside the containment vessel 11, and by making the condensing type heat exchanger 41 communicate with the heat dissipater 42 through a liquid returning pipe 42 and a gas inflow pipe 44.

A system composed of pressure vessel bottom water flooding pipes 51, an isolation valve 52 and a fuse valve 53 is a system for keeping a reactor-core melted substance inside the pressure vessel 1 in an event of occurrence of such a severe accident that the reactor core is melted down onto the bottom head of the pressure vessel 1 though such a severe accident hardly occurs, and the system cools the outer surface of the bottom head of the pressure vessel 1 by injecting cooling water of the pressure suppression pool 14 into the lower portion of the drywell 13 through the pressure vessel bottom water flooding pipe 51.

In the inside of the reactor containment vessel 11 described above, a heat exchanger 72 is arranged in the pressure suppression pool 14. A main steam pipe 5 is branched between a main steam isolation valve 25 and a heat exchanger 4, and a steam pipe 68 with an isolation valve 66 for making the main steam pipe 5 communicate with the heat exchanger 72 is arranged. Further, a feedwater pipe 6 is branched between an isolation valve 65 and a heat exchanger 4, and a cooling water returning pipe 69 with an isolation valve 67 for making the feedwater pipe 6 communicate with the heat exchanger 72 is arranged.

In a case where the main condenser can not be used during reactor shutdown, or in a case where an accident of bringing the inside of the pressure vessel into an overheated state occurs, the main stream isolation valve 25 and the isolation valve 65 are closed and the isolation valve 66 and the isolation valve 67 are opened. Decay heat in the reactor primary system is removed by boiling of cooling water in the secondary system of the heat exchanger 4, and steam of the secondary system flows from the steam pipe 68 into the heat exchanger 72 to be cooled and condensed by water inside the pressure suppression pool 14.

On the other hand, the condensed water of the heat exchanger 72 flows into the cooling water returning pipe 69 to be supplied to the heat exchanger 4. The decay heat in the reactor primary system is transferred to the water in the pressure suppression pool 14 through the heat exchanger 72 to increase temperature of the water in the pressure suppression pool 14.

Steam is generated when the water temperature of the pressure suppression pool 14 exceeds the saturation temperature, and the steam in the upper plenum 15 of the pressure suppression pool 14 is condensed by the condensing type heat exchanger 41. Therefore, the pressure suppression pool 14 is cooled. The decay heat in the reactor primary system is discharged outside the containment vessel by the heat dissipater 43 which communicates with the condensing type heat exchanger 41 through the liquid returning pipe 42 and the gas inflow pipe 44.

Thereby, the decay heat in the reactor primary system can be removed without letting the cooling water of the reactor primary system into the containment vessel. Since the present embodiment can remove the decay heat in the reactor primary system without using any active components such as a pump or the like, there is no need to provide the isolation cooling pool and the shielding structure which have been arranged outside the containment vessel in a conventional boiling water reactor. Therefore, the economic feasibility, the reliability and the safety of the nuclear reactor can be improved.

Figure 3:
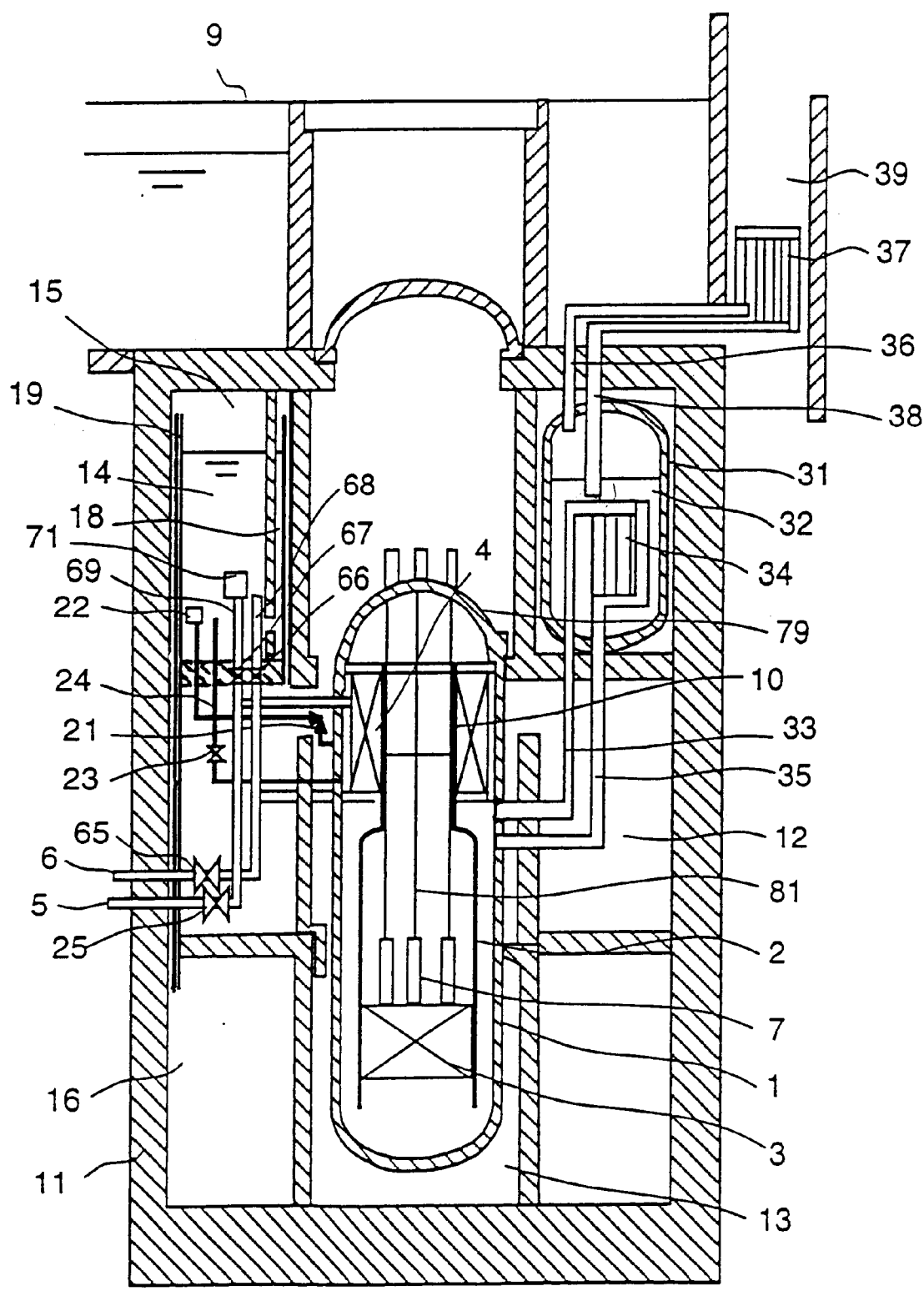
FIG. 3 is a vertical cross-sectional view showing a second embodiment of a reactor containment vessel in accordance with the present invention.

A second embodiment in accordance with the present invention will be described below, referring to FIG. 3. The second embodiment is that in the nuclear reactor shown in the first embodiment, the main steam pipe 5 is branched between the main steam isolation valve 25 and the heat exchanger 4, and a steam pipe 68 with an isolation valve 66 for making the main steam pipe 5 communicate with the pressure suppression pool 14 is arranged. A quencher 71 for moderating pressure fluctuation during steam condensing is arranged in the outlet of the steam pipe 68. Further, a feedwater pipe 6 is branched between an isolation valve 65 and a heat exchanger 4, and a cooling water returning pipe 69 with an isolation valve 67 for making the feedwater pipe 6 communicate with the pressure suppression pool 14 is arranged.

Although the decay heat in the reactor primary system needs to be removed during reactor shutdown, there is a possibility that the main condenser can not be used at that time though the possibility is very low. The conventional reactor has a cooling system using an active component for taking such a case into consideration. In the present embodiment, the system for removing the decay heat in the primary system using the heat exchanger in accordance with the present invention will be described below.

In a case where the main condenser can not be used during reactor shutdown, the main stream isolation valve 25 and the isolation valve 65 are closed and the isolation valve 66 and the isolation valve 67 are opened.

Decay heat in the reactor primary system is removed by boiling of cooling water in the secondary system of the heat exchanger 4, and steam of the secondary system flows from the steam pipe 68 into the heat exchanger 72 to be cooled and condensed by water inside the pressure suppression pool 14. On the other hand, the condensed water of the heat exchanger 72 flows into the cooling water returning pipe 69 to be supplied to the heat exchanger 4. Thereby, the decay heat in the reactor primary system can be removed without letting the cooling water of the reactor primary system into the containment vessel. Since the present embodiment can remove the decay heat in the reactor primary system without using any active components such as a pump or the like, the economic feasibility, the reliability and the safety of the nuclear reactor can be improved. The other constructions and functions are the same as those of the first embodiment.

Figure 4:
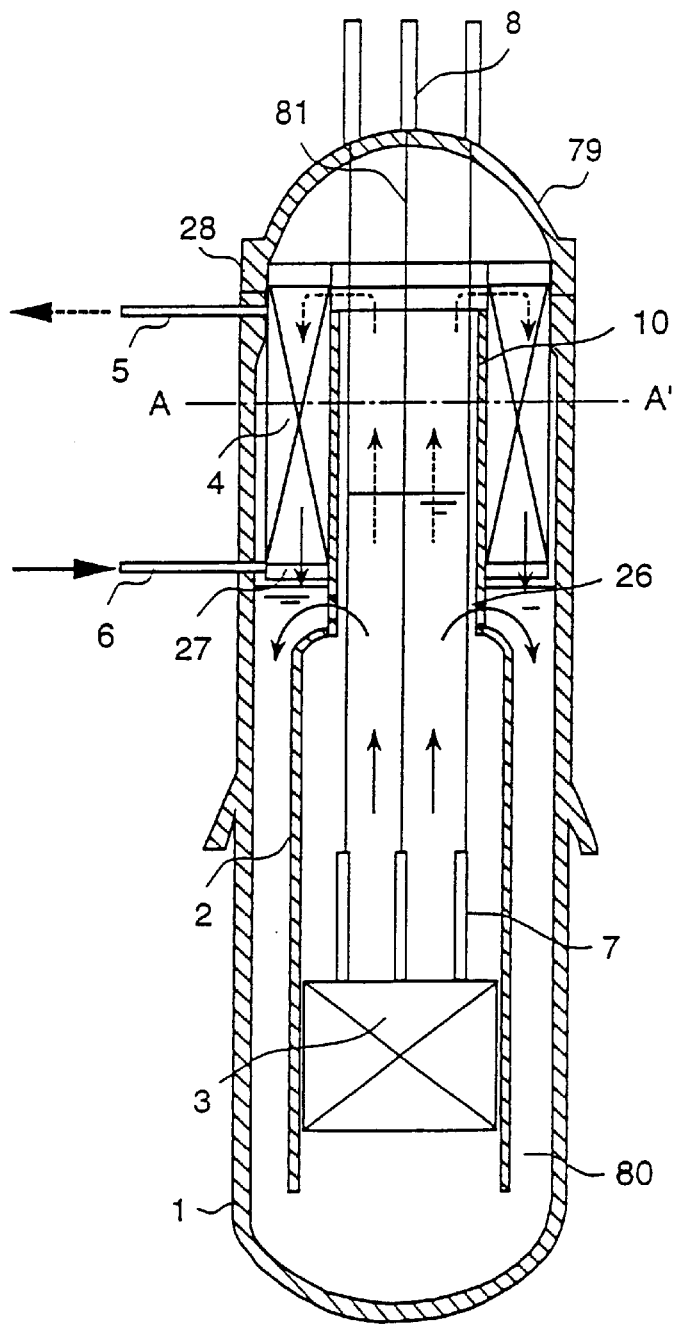
FIG. 4 is a vertical cross-sectional view showing a third embodiment of a reactor pressure vessel in accordance with the present invention.
Figure 5:
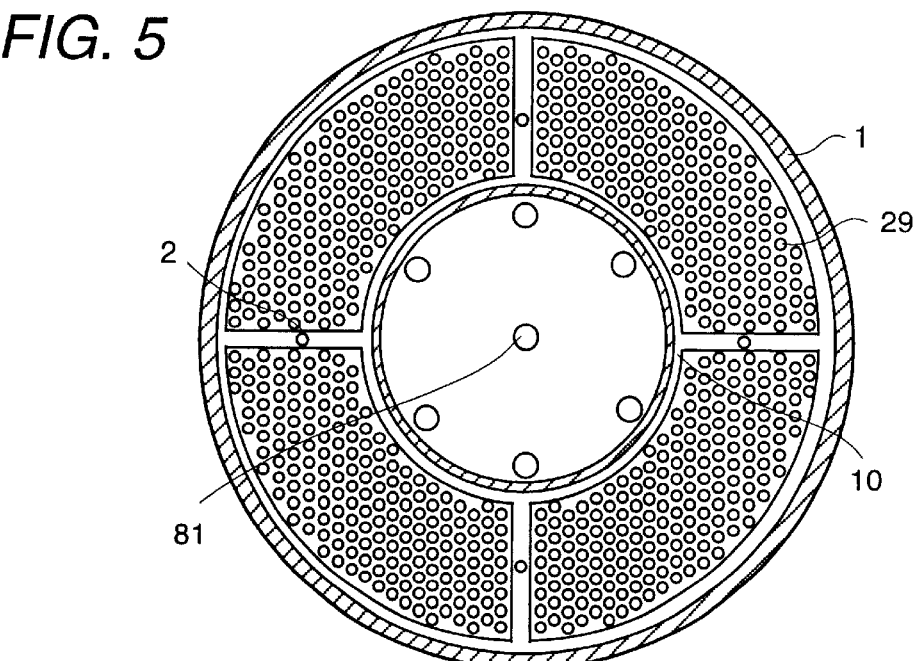
FIG. 5 is a horizontal cross-sectional view showing the reactor pressure vessel being taken on the plane of the line A—A' and seeing from the top.
Figure 7:
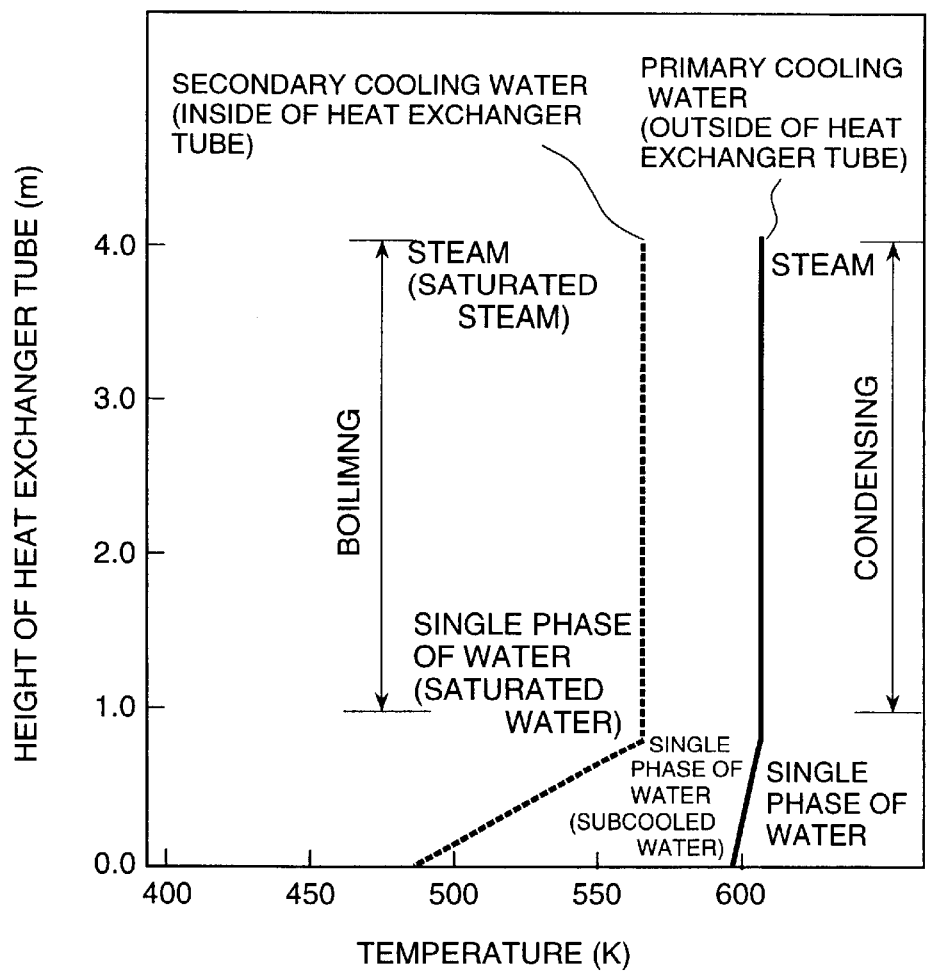
FIG. 7 is a diagram showing the concept of heat balance in the third embodiment in accordance with the present invention.
Figure 6:
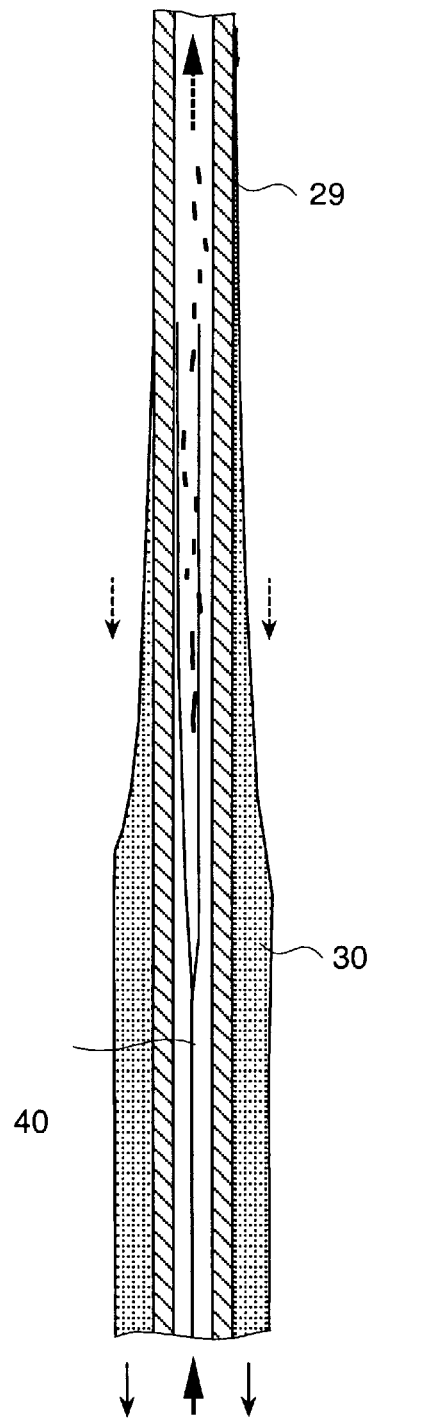
FIG. 6 is a vertical cross-sectional view showing a heat exchanger tube in the third embodiment of the present invention.

An example of the structure inside a reactor pressure vessel suitable for being employed in each of the embodiments in accordance with the present invention will be described below as a third embodiment. FIG. 4 is a vertical cross-sectional view showing the inside of the pressure vessel to which the third embodiment is applied, and FIG. 5 is a horizontal cross-sectional view showing the inside of the pressure vessel, and FIG. 6 is a vertical cross-sectional view showing a heat exchanger tube, and FIG. 7 is a diagram showing the heat balance of the primary system cooling water and the secondary system cooling water in a region between the heat exchanger feed-water header and the steam header.

The structure of the reactor pressure vessel employed in the first embodiment and the second embodiment is as follows. An annular baffle plate 10 having a flow cross-sectional area smaller than a flow area of the shroud 2 is arranged above the shroud 2 inside the pressure vessel 1 of the nuclear reactor, and the heat exchanger 4 is arranged outside the baffle plate 10. The heat exchanger 4 is placed in a position at a level higher than that of a water level inside the pressure vessel during the normal operation, and accordingly steam of the primary cooling water is condensed in the heat exchanger 4 to transfer the heat to the secondary cooling water.

Further, a gap is formed between the upper portion of the shroud 2 and the baffle plate 10 to form a flow passage 26, and consequently part of the primary cooling water heated by the reactor core 3 and flowing upward inside the shroud 2 circulates by flowing down from the flow passage 26 to a downcomer 80.

The secondary steam generated in the heat exchanger 4 is transferred from the main steam pipe 5 to the outside of the containment vessel 11 through a steam header 28 and the main steam isolation valve 25 to be used for driving a turbine for electric power generation or used for purpose of heat supply. Feed water from the outside of the containment vessel 11 is supplied from the feed-water header 27 to the heat exchanger 4 through a feed water pipe 6 and the isolation valve 65. By extracting and supplying the secondary cooling water through the upper head 79 of the pressure vessel, it is possible to prevent an event in relating to loss of primary cooling water from occurring because there is no large diameter pipe in a position at a level lower than the water surface level of the primary cooling water in the pressure vessel 1.

The horizontal cross-sectional view of FIG. 5 shows the cross section on the plane of the line A—A' of FIG. 4. The heat exchanger 4 is composed of four heat exchanger sectional units. The number of the heat exchanger sectional units is equal to number of the main stream pipe 5 lines, and each of the heat exchanger sectional units of the heat exchanger 4 is allocated to and connected to each of the main stream pipe 4 lines to individually form a system. By arranging the plurality of heat exchanger 4 sectional units as described above, even in an event of occurrence of a rupture in one of the secondary pipe lines such as the main steam pipe 5 or the feed water pipe 6, cooling of the primary cooling water in the pressure vessel 1 can be continued using the other systems in which no rupture occurs in the line.

The tube 29 of the heat exchanger 4 is shown in the vertical cross-sectional view of FIG. 6. In the primary side of the heat exchanger 4, the primary system steam flowing from the upper portion is condensed on the upper portion of the heat exchanger tube 29, and the primary system condensed water 30 flows downward to the lower portion of the heat exchanger tube in a form of liquid film. In the secondary side of the heat exchanger 4, the single phase secondary system feed water 40 flows in from the lower portion, and is heated and boiled by the primary system flowing-down liquid film, and is further heated by condensing heat transfer of the primary system to be turned into secondary system steam. Since the heat transfer is performed by condensing and liquid film heat transfer in the primary system and by boiling heat transfer in the secondary system, high efficiency heat exchange can be performed.

By forming the outer diameter of the baffle plate 10 smaller than the diameter of the shroud 2, the wide installation room for the heat exchanger 4 is secured in the annular space between the baffle plate 10 and the pressure vessel 1, as shown in FIG. 5, and consequently the heat exchanging heat transfer area of the heat exchanger 4 can be secured wider.

FIG. 7 shows the concept of heat balance in the present embodiment of the nuclear reactor. In the present embodiment, the flow pattern and the cooling water temperature of the primary system and the secondary system were calculated using dimensions of a typical boiling water reactor and under conditions of primary system pressure of 12.3 MPa, secondary system pressure of 7.1 MPa, thermal output of the reactor core of 434 MWt, height of the heat exchanger 4 of 4 m, and heat transfer area of 2500 m$^2$. When temperature of the primary system steam at the inlet of the heat exchanger 4 is set to 598 K, temperature of the primary system cooling water at the outlet becomes 593 K by heat exchange. On the other hand, when temperature of the secondary system cooling water at the inlet is set to 489 K equivalent to the feed water temperature of the existing boiling water reactor, secondary system steam having temperature of 559 K can be obtained.

According to the present embodiment, since the heat transfer is performed by condensing and liquid film heat transfer in the primary system and by boiling heat transfer in the secondary system, there is an effect in that economic feature of the nuclear reactor can be improved.

Figure 8:
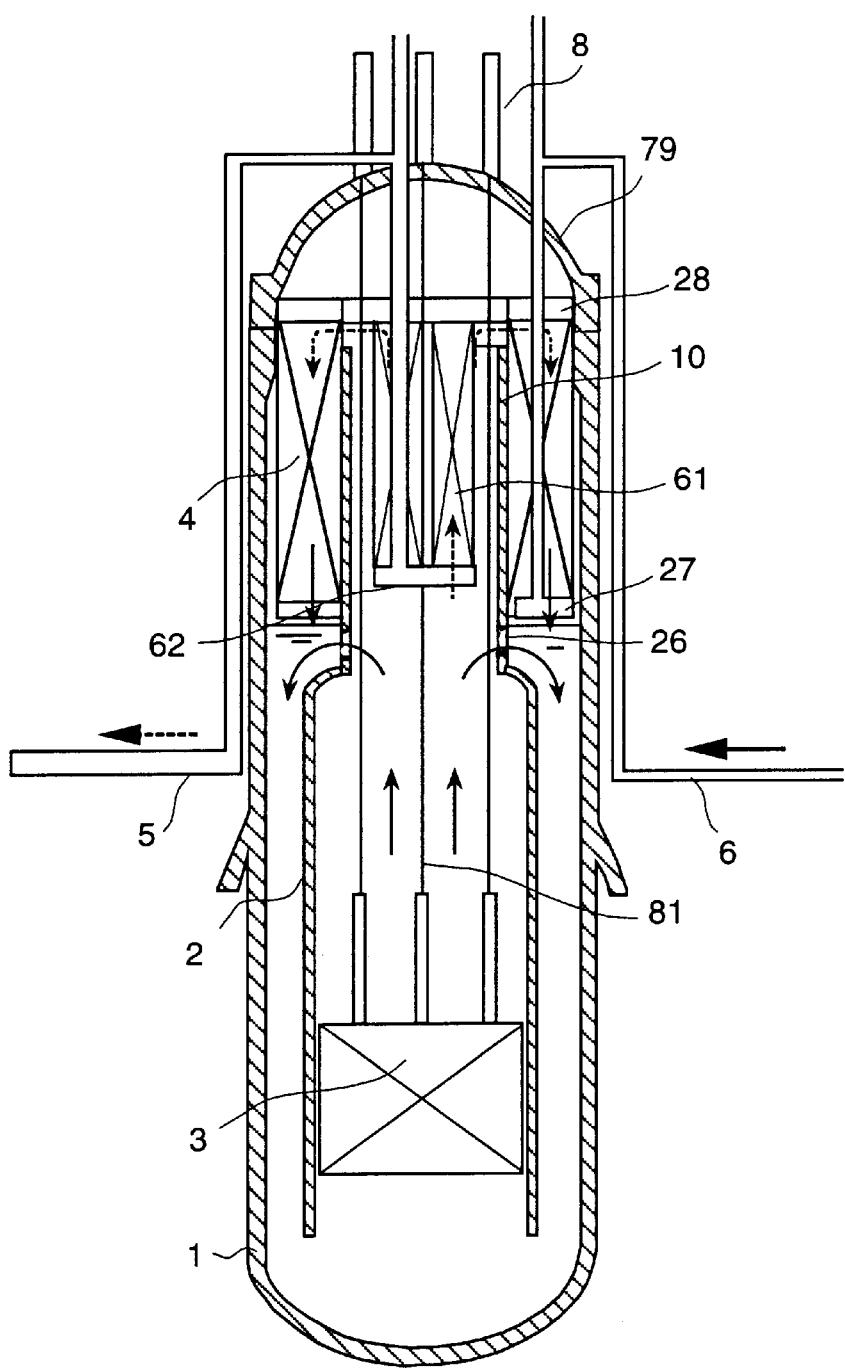
FIG. 8 is a vertical cross-sectional view showing a fourth embodiment of a reactor pressure vessel in accordance with the present invention.
Figure 9:
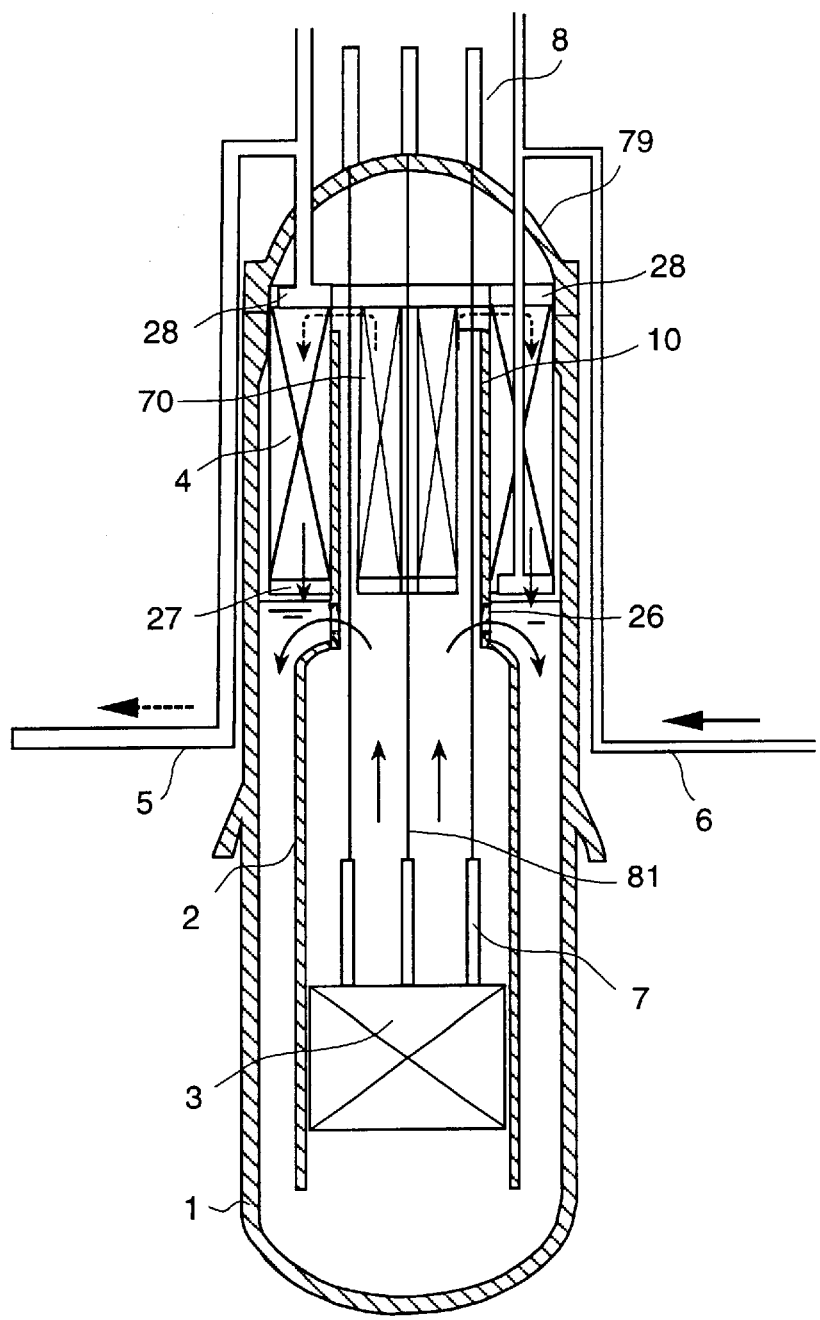
FIG. 9 is a vertical cross-sectional view showing a fifth embodiment of a reactor pressure vessel in accordance with the present invention.
Figure 10:
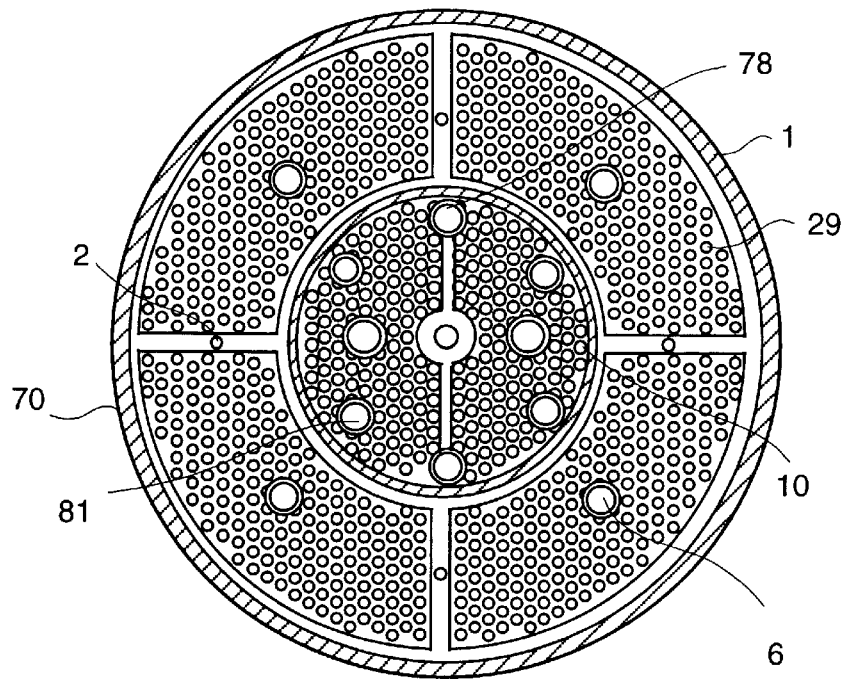
FIG. 10 is a horizontal cross-sectional view showing the fifth embodiment of the reactor pressure vessel in accordance with the present invention.

Examples of the structure inside a reactor pressure vessel applicable to each of the first embodiment and the second embodiment in accordance with the present invention will be described below as a fourth embodiment and a fifth embodiment. FIG. 8 is a vertical cross-sectional view showing the reactor pressure vessel 1 to which the fourth embodiment is applied, and FIG. 9 is a vertical cross-sectional view showing the reactor pressure vessel 1 to which the fifth embodiment is applied, and FIG. 10 is a horizontal cross-sectional view showing the heat exchanger 4.

The present embodiment is that in the pressure vessel 1 shown in the third embodiment, a superheater 61 and a heat exchanger 4, which are heated by the primary cooling water circulating through the reactor core 3, are arranged inside the baffle plate 10. Referring to FIG. 8 and FIG. 9, the pressure vessel 1 is of a type of inserting control rods 7 from the upper portion, and control rod drive mechanisms 8 are attached to the top head 79 of the vessel.

By making both of or either of the superheater 61 and the heat exchanger 4 supported by the top head 79 of the pressure vessel together with control rod drive shafts of the control rod drive mechanisms 79, when both of or either of the superheater 61 and the heat exchanger 4 is taken off at maintenance of the pressure vessel 1, both of or either of the superheater 61 and the heat exchanger 4 can be easily taken off from the pressure vessel 1 by pulling up both of or either of the superheater 61 and the heat exchanger 4 together with the top head 79 of the pressure vessel 1.

In the pressure vessel 1 shown in FIG. 8, the superheater 61 is arranged inside the baffle plate 10. The secondary cooling water flowing from the feed water header 27 into the heat exchanger 4 is heated to be changed to steam and reaches a steam header 28. Then, the steam is further superheated by the primary cooling water circulating through the reactor core 3 while the steam is flowing down in the superheater 61, and becomes high-quality steam having a less moisture content to flow out from a steam header 62 to the main steam pipe 5. In the pressure vessel 1 shown in FIG. 9, the heat exchanger 70 is arranged inside the baffle plate 10. The secondary cooling water flowing from the feed water header 27 into the heat exchanger 4 is heated in the heat exchanger 4 and the heat exchanger 70 to be changed to steam and reaches the steam header 28. Then, the steam flows out to the main steam pipe 5.

In the present embodiment, there is an effect that the safety of the nuclear reactor is improved because it is possible to prevent an event in relating to loss of primary cooling water from occurring. Further, there is an effect that the safety of the nuclear reactor can be improved because cooling of the primary cooling water can be continued in an event of occurrence of a rupture in the secondary system pipe. Further, there is an effect that the maintainability of the nuclear reactor can be improved because when both of or either of the superheater 61 and the heat exchanger 4 is taken off at maintenance of the pressure vessel, both of or either of the superheater 61 and the heat exchanger 4 can be taken off together with the top head 79 of the pressure vessel 1.

Furthermore, in the embodiment shown in FIG. 8, there is an effect that the economic feasibility of the nuclear reactor can be improved because moisture content in the secondary steam can be reduced to improve the thermal efficiency. In the embodiment shown in FIG. 9, there is an effect that the economic feasibility of the nuclear reactor can be improved because the total heat transfer area of the heat exchanger can be increased to increase the output power of the nuclear reactor.

Figure 11:
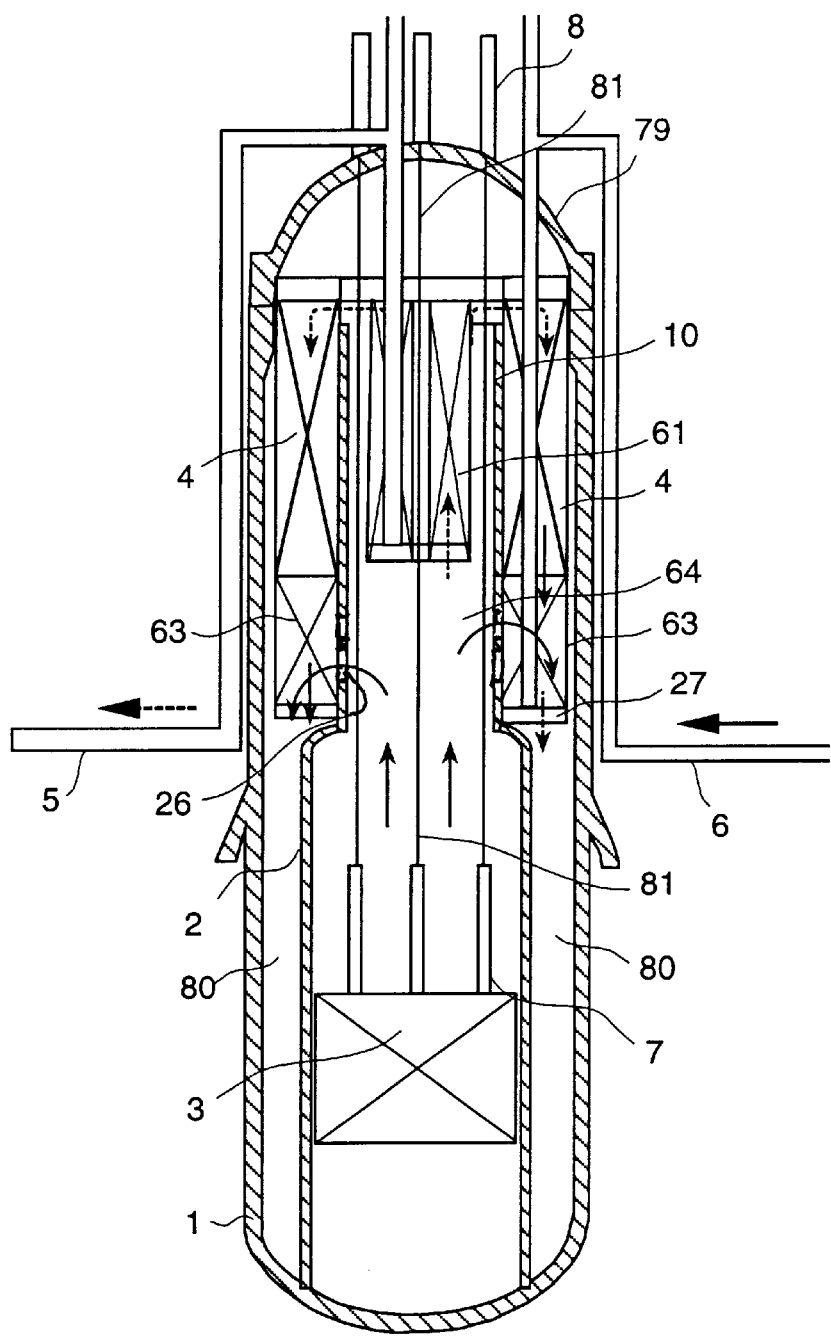
FIG. 11 is a vertical cross-sectional view showing a sixth embodiment of a reactor pressure vessel in accordance with the present invention.

An example of the structure inside a reactor pressure vessel 1 applicable to each of the first embodiment and the second embodiment in accordance with the present invention will be described below as a sixth embodiment. FIG. 11 is a vertical cross-sectional view showing the reactor pressure vessel to which the sixth embodiment is applied. That is, in the pressure vessels shown by the third embodiment and the fourth embodiment, a preheater 63 is arranged in a position at a level lower than the heat exchanger 4 and lower than the water level of the cooling water of the downcomer 80. The secondary cooling water flowing from the feed water header 27 into the preheater 63 is heated by the primary cooling water inside the downcomer 80, and then the secondary cooling water in an easily boiling state of a small subcooling degree flows into the heat exchanger 4.

After that, the secondary cooling water is heated by the heat exchanger 4 to change into steam and reaches the steam header 28, and then flows out to the main steam pipe 5. Since the boiling heat transfer region in the heat exchanger 4 is increased, heat transfer of the secondary cooling water is improved to decrease the moisture content in the steam.

Further, by separating the feed water header of the preheater 63 from the feed water header of the heat exchanger 4, and by controlling feed water flow rates of the both systems, an amount of transferred heat of the primary cooling water in the downcomer 80 can be controlled. Thereby, since the subcooling degree of the primary cooling water at the reactor core inlet can be controlled, the operability of the nuclear reactor can be improved.

In the present embodiment, since the heat transfer performance of the heat exchanger can be improved to decrease the moisture content in the secondary steam, there is an effect in that the thermal efficiency can be improved and the economic feasibility of the nuclear reactor can be improved. Further, since the subcooling degree of the primary cooling water at the reactor core inlet can be controlled, there is an effect in that the operability of the nuclear reactor can be improved.

In order to employ the third embodiment, the fourth embodiment or the fifth embodiment of the pressure vessel to the first embodiment or the second embodiment, the main steam pipe 5 after projecting upward from the pressure vessel 1 is branched to an upward branched main steam pipe 5 and a downward branched main steam pipe 5. The upward branched main steam pipe 5 is connected to the isolation valve 66 and then connected to the heat exchanger 72 through a steam pipe 68. On the other hand, the downward branched main steam pipe 5 is connected to the main steam isolation valve 25. Further, the feed water pipe 6 after projecting upward from the pressure vessel 1 is branched to an upward branched feed water pipe 6 and a downward branched feed water pipe 6. The upward branched feed water pipe 6 is connected to the isolation valve 67 and then connected to the heat exchanger 72 through the cooling water returning pipe 69. On the other hand, the downward branched feed water pipe 6 is connected to the isolation valve 65.

Figure 12:
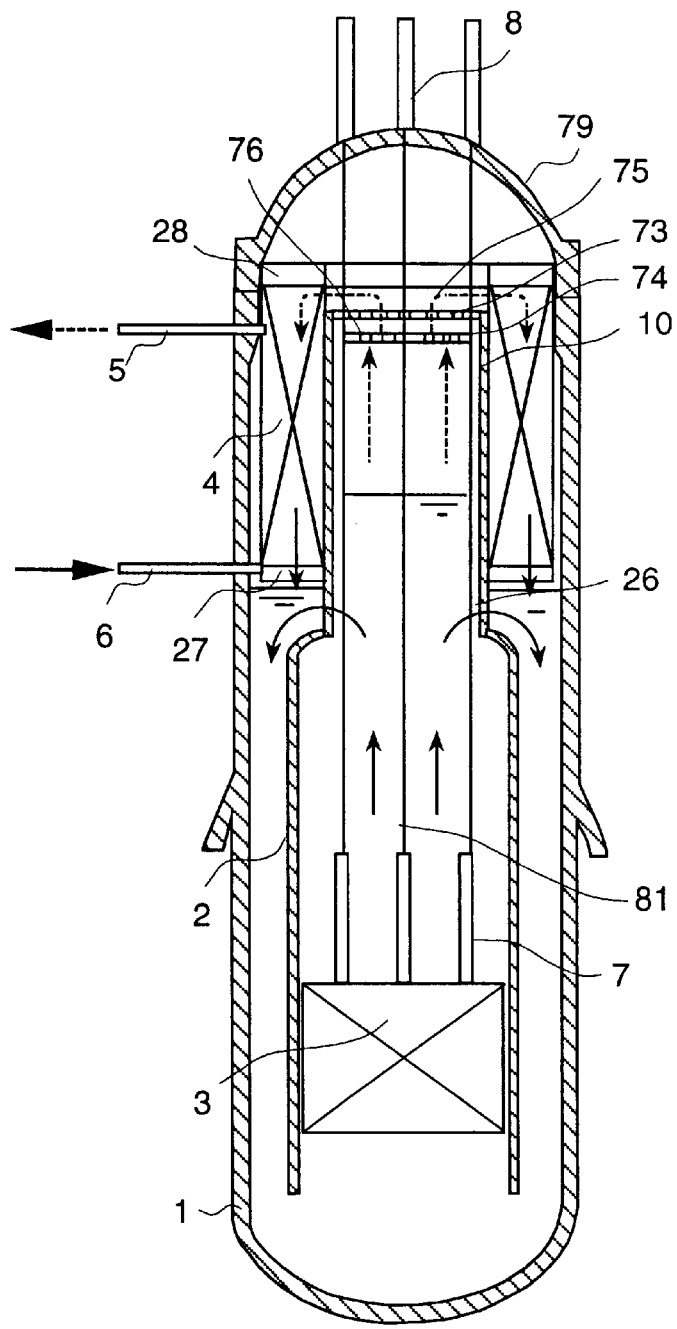
FIG. 12 is a vertical cross-sectional view showing a seventh embodiment of a reactor pressure vessel in accordance with the present invention.

An example of the structure inside a reactor pressure vessel 1 applicable to each of the first embodiment and the second embodiment in accordance with the present invention will be described below as a seventh embodiment. FIG. 12 is a vertical cross-sectional view showing the reactor pressure vessel to which the seventh embodiment is applied. FIG. 12 shows an example in which the present embodiment is applied to the third embodiment of the reactor pressure vessel. As shown in FIG. 12, in the reactor pressure vessel 1 shown in the third embodiment, a baffle plate 73 and a baffle plate 74 are placed inside the baffle plate 10 so as to intersecting at right angle with the flow direction of the two-phase cooling water flow flowing from the inside of the shroud 2 into the baffle plate 10. The baffle plate 73 and the baffle plate 74 individually have a plurality of flow passage holes 75, 76, respectively, and the flow passage holes 75 in the baffle plate 73 and the flow passage holes 76 in the baffle plates 74 are formed at arrangement positions so as to not vertically overlapped with one another.

The primary cooling water in a two-phase flow flowing up inside the baffle plate 10 collides against the baffle plate 74 to change the flow direction to the horizontal direction, and then part of the primary cooling water flows into the gap between the baffle plate 73 and the baffle plate 74 through the flow passage holes 76. Since the positions of the flow passage holes 76 and the flow passage holes 75 are different from one another, the cooling water flowing into the gap through the flow passage holes 76 collides against the baffle plate 73. After that, the cooling water changes the flow direction to the horizontal direction, and then passes through the flow passage holes 75 to the plenum above the baffle plate 73. Steam separation of the two-phase primary cooling water is accelerated by the collision and the flow direction change from flowing inside the baffle plate 10 to passing through the baffle plate 73 to the upper portion. Thereby, the moisture content in the primary cooling water reaching the heat exchanger 4 from the baffle plate 73 is decreased to improve the heat transfer performance of the heat exchanger.

In order to apply the seventh embodiment of the reactor pressure vessel 1 to the first embodiment or the second embodiment, the main steam pipe 5 in the sixth embodiment is branched into two pipes at a position outside the reactor pressure vessel 1, and one of the branched pipes is connected to the isolation valve 66, and the other of the branched pipes is connected to the main steam isolation valve 25. On the other hand, the feed water pipe 6 is branched into two pipes at a position outside the reactor pressure vessel 1, and one of the branched pipes is connected to the isolation valve 67, and the other of the branched pipes is connected to the main steam isolation valve 65.

Figure 14:
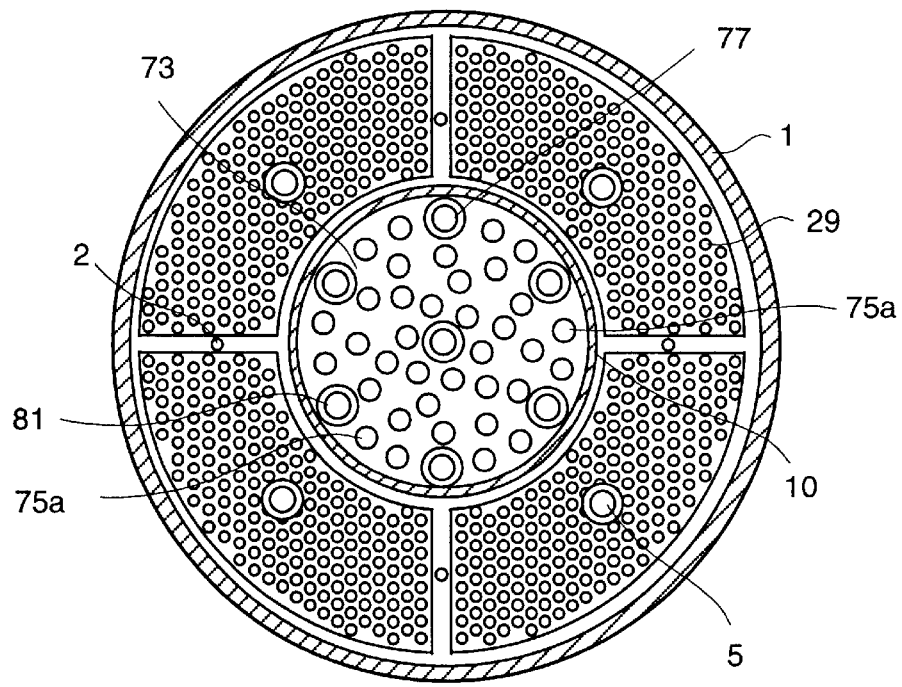
FIG. 14 is a horizontal cross-sectional view of the eighth embodiment of the reactor pressure vessel in accordance with the present invention seeing downward at the level of a baffle plate.
Figure 13:
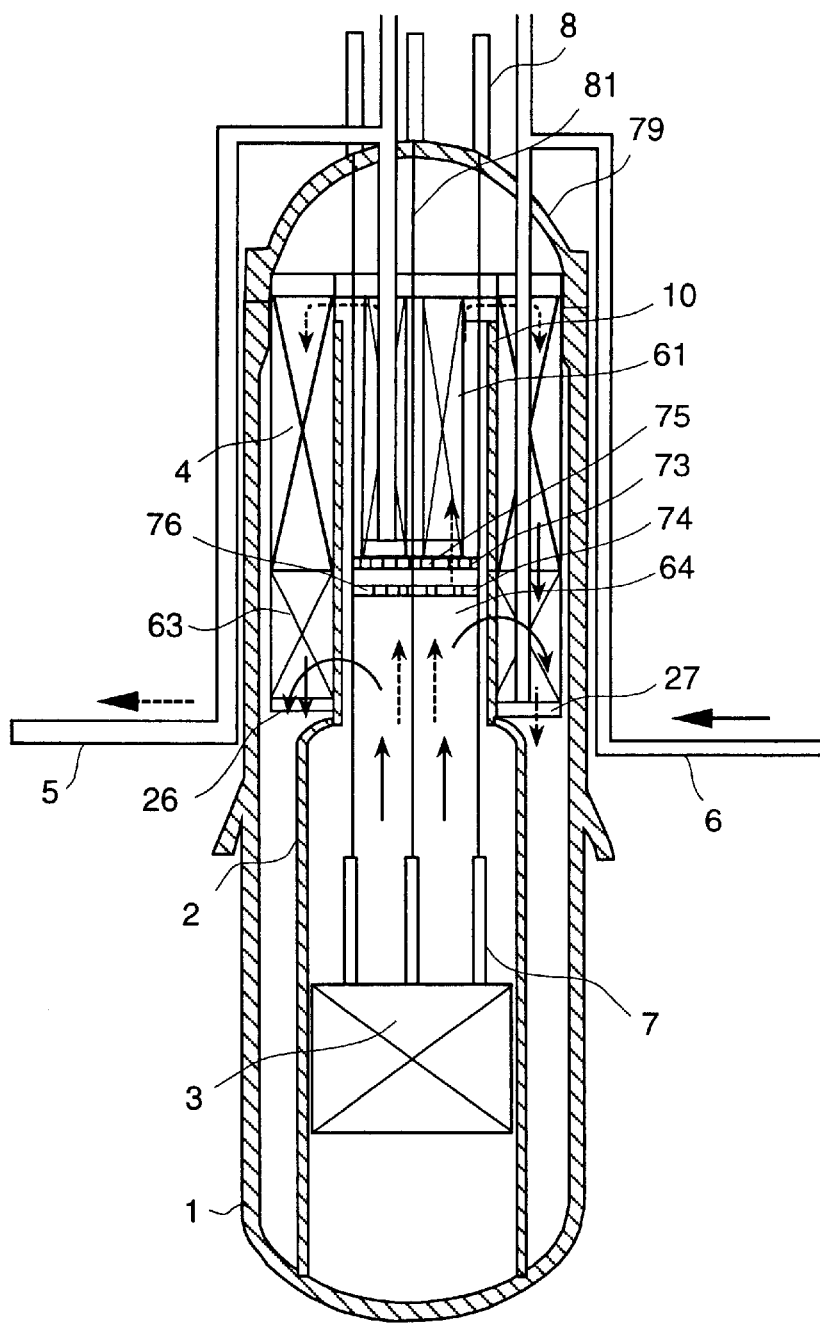
FIG. 13 is a vertical cross-sectional view showing an eighth embodiment of a reactor pressure vessel in accordance with the present invention.
Figure 15:
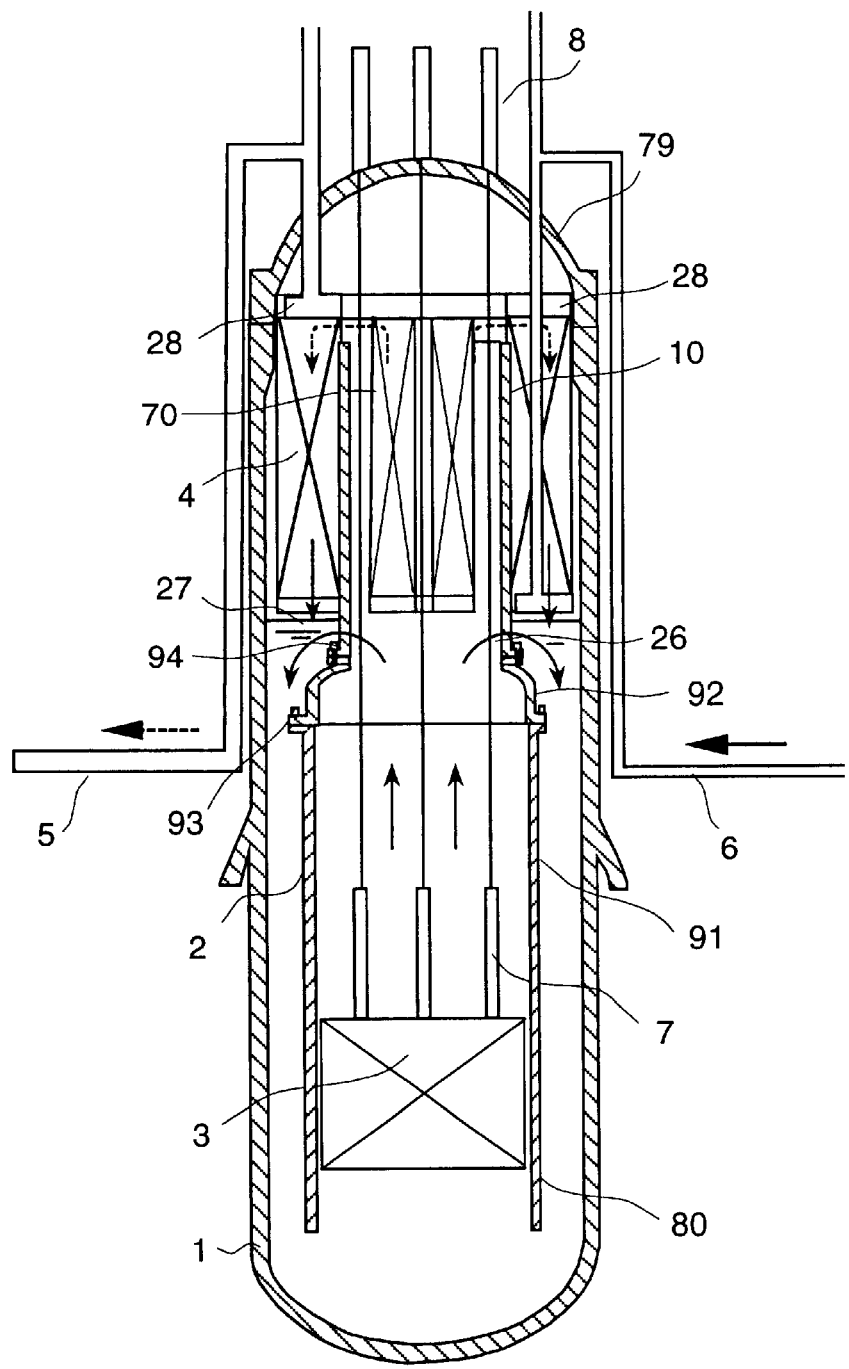
FIG. 15 is a vertical cross-sectional view showing the inside of a reactor pressure vessel expressing an assembling state of a shroud and a baffle plate in the reactor pressure vessel in accordance with the present invention.

Similarly, FIG. 13 shows an eighth embodiment, and FIG. 14 shows the horizontal cross-sectional view. The embodiment eighth is an example in which the baffle plate 73 and the baffle plate 74 of the seventh embodiment are added to the fourth embodiment so as to arrange them below the superheater 61 as in the sixth embodiment.

Since the structure inside the reactor pressure vessel of FIG. 13 is that in the structure shown in FIG. 11, the baffle plate 73 and the baffle plate 74 are arranged inside the baffle plate 10 so as to intersect at right angle with the flow direction of the two-phase cooling water flowing from the inside of the shroud 2 into the inside of the baffle plate 10, the eighth embodiment has the same operation and the same effect to the siperheater 61 as those of the seventh embodiment shown in FIG. 12.

In the present embodiment, there is an effect in that the economic feasibility of the nuclear reactor can be improved because the heat transfer performance of the heat exchange is improved and accordingly the moisture content in the secondary steam is decreased to improve the thermal efficiency.

In order to apply the eighth embodiment of the reactor pressure vessel 1 to the first embodiment or the second embodiment, the main steam pipe 5 and the feed water pipe 6 are individually connect to the isolation valves, similarly to the case of the fourth embodiment.

A matter relating to assembling of the shroud 2 and the baffle plate 10 to the reactor pressure vessel 1 in each of the embodiments described above will be described below. Although the description will be made by taking the fifth embodiment in accordance with the present invention as an example, the description is applicable to each of the other embodiments.

The shroud 2 surrounding the reactor core 3 is divided into a plurality of parts, for example, into a lower shroud 91 and an upper shroud 92. The lower shroud 91 and the upper shroud 92 are vertically joined together with bolts 93. The upper shroud 92 and the baffle plate 10 are vertically joined together with bolts 94.

Therefore, the baffle plate 10, the upper shroud and the lower shroud 91 can be split into individual parts by unfastening the bolts 93, 94. By the structure described above, the reactor core 3 and the control rods 7 can be taken out without interfering with the other parts at disassembling the core internals during scheduled inspection of the nuclear reactor by removing the baffle plate 10, the upper shroud 92 and the lower shroud 91 in this order from the top.

Since disassembling work time during the scheduled inspection of the nuclear reactor can be shortened by employing the above-described assembling structure of the baffle plate 10, the upper shroud 92 and the lower shroud 91, there is an effect in that a period of the scheduled inspection can be shortened and accordingly the economic feature of the nuclear reactor can be improved.

The reactor pressure vessel 1 according to any one of the third embodiment to the eighth embodiment using the shroud 2 and baffle plate 10 having the above-described assembling structure is installed inside the containment vessel 11 having the decay heat removal system described in the first embodiment or the second embodiment.

Here, it is assumed that an accident of the main steam pipe 5 rupture or the feed water pipe 6 rupture occurs inside the containment vessel 11 which contains any one of the reactor pressure vessels described above. Initially, both of the isolation valves 26, 65 are closed to isolate influence of the accident from the outside of the containment vessel though during normal operation both of the isolation valves 26, 65 have been opened so as to supply steam to the turbine for electric power generation through the main steam pipe 5 as the driving steam and so as to return condensate water of the used steam to the heat exchanger 4 through the feed water pipe 6.

At the same time, both of the isolation valves 66, 67 are opened to dissipate decay heat from the inside of the pressure vessel 1 into the pressure suppression pool 14, as described in the descriptions of the first embodiment and the second embodiment. It is difficult to transfer the heat inside the pressure vessel 1 from the heat exchanger 4 connected to the broken main steam pipe 5 or the broken feed water pipe 6 to the side of the quencher 22 or the heat exchanger 72 illustrated in FIG. 3 which is also connected to the broken main steam pipe 5 or the broken feed water pipe 6, respectively. However, since between the pressure vessel 1 and the pressure suppression pool 14, there are provided the plurality of decay heat removal systems from the main steam pipe 5 or the feed water pipe 6, and the heat exchanger 4 to the heat exchanger 72 or the quencher 22 in FIG. 3, removing of decay heat can be performed using the unbroken decay heat removal systems. Therein, in the case of the second embodiment, both of the isolation valves 66, 67 communicating with the broken main steam pipe 5 are closed to prevent the water in the pressure suppression pool 14 from leaking through the main steam pipe 5 or the feed water pipe 6.

When an accident of the main steam pipe 5 rupture or the feed water pipe 6 rupture occurs, an incondensable gas in the drywell 12 initially flows into the pressure suppression pool 14 through the vent pipes 18, and then flows into the wetwell 16 together with an incondensable gas existing in the upper plenum of the pressure suppression pool 14 through the communicating pipe 19. After that, steam flowing out through the portion of pipe rupture flows into the pressure suppression pool 14 to be condensed by the pool water. The upper plenum of the pressure suppression pool 14 is filled with the incondensable gas remaining in the upper portion of the pool and steam having a steam vapor pressure corresponding to the saturation pressure of the pool water. As inflow of the steam is further continued, the incondensable gas having a lighter specific weight flows into the wetwell 16 through the communicating pipe 19.

At that time, the pressure in the pressure suppression pool, that is, the pressure in the containment vessel becomes a value of the sum of the pressure of incondensable gas pressure and the partial pressure of the steam in a conventional nuclear reactor. However, in the nuclear reactor in accordance with the present invention, because the incondensable gas is separated to the wetwell and the steam is separated to the pressure suppression pool 14, the pressure in the containment vessel becomes a higher pressure between the both partial pressures. Therefore, the pressure in the containment vessel 11 becomes a value of the sum of the incondensable gas partial pressure and the steam partial pressure, and accordingly the pressure in the containment vessel 11 can be suppressed to be increased.

When the water temperature of the pressure suppression pool 14 is low, the incondensable gas remains in the upper plenum of the pressure suppression pool 14 because the partial pressure of the incondensable gas is high, and the pressure in the containment vessel becomes equal to the pressure of the incondensable gas. On the other hand, when the water temperature of the pressure suppression pool 14 is high, the pressure in the containment vessel becomes equal to the partial pressure of the steam and part of the steam flows into the wetwell 16 because the partial pressure of the steam is high.

Calculating a case where the volume of the wetwell 16 is equal to the sum of the volumes of the drywell 12 and the lower drywell 13, the partial pressure of the incondensable gas becomes approximately 2 atmospheres and the partial pressure of the steam becomes approximately 5 atmospheres at pool water temperature of 160 degrees. Therefore, in the conventional technology, the pressure in the containment vessel becomes approximately 7 atmospheres. On the other hand, in the present invention, the pressure in the containment vessel is suppressed to approximately 5 atmospheres and accordingly the pressure can be reduced by 2 atmospheres. As described above, the safety of the nuclear reactor can be improved because the pressure increase at occurrence of the accident can be suppressed, and the economic feature in relation to manufacturing of the nuclear reactor can be improved because the design pressure of the containment vessel can be reduced and the strength of the structural material can be optimized.

Since discharging of the steam through the broken port in an event of accident is equivalent to discharging of the cooling water outside the pressure vessel 1, the water level on the pressure vessel 1 is decreased. Thereby, since the lower ends of the pressure vessel water injection pipe 35 and the heat exchanger inflow pipe 33 become higher than the water level in the pressure vessel 1, the cooling water filled in the pressure vessel water injection pipe 35 and the heat exchanger inflow pipe 33 and the heat exchanger 34 flow down into the pressure vessel 1, and the insides of the pressure vessel water injection pipe 35 and the heat exchanger inflow pipe 33 and the heat exchanger 34 are filled with steam instead.

In the heat exchanger 34, the steam is heat-removed and condensed by the cooling water in the cooling vessel 31, and the condensed water flows down through the pressure vessel water injection pipe 35 to be injected into the pressure vessel 1. The steam in the pressure vessel 1 is newly sucked through the heat exchanger inflow pipe 33 by flowing-down of the condensed water. Thus, the condensation in the heat exchanger 34 and the injection of the condensed water into the pressure vessel 1 are continued.

On the other hand, the cooling water in the cooling vessel 31 boils because heat is transferred to the cooling water in the cooling vessel 31 by condensation in the heat exchanger 34. The steam generated by the boiling flows into the gas inflow pipe 36 to be condensed in the heat dissipater 37 cooled by atmospheric air inside the ventilation duct 39 outside the reactor building. The condensed water in the heat dissipater 37 is circulated to the cooling vessel 31 through the liquid returning pipe 38. Thereby, the heat generated in the reactor core 3 transferred to atmospheric air in natural convection inside the ventilation duct 39 through the heat exchanger 34, the cooling vessel 31 and the heat dissipater 37.

The heat removal described above can be attained using only the piping and the heat exchangers without using any active components such as a pump, a valve and the like, and not limited by an amount of cooling water, and the heat dissipation by atmospheric air can be permanently continued. Therefore, long-term cooling can be performed until the accident event is completely settled. In addition, since the heat removal system is of a double isolation structure that the steam flowing from the pressure vessel 1 is isolated by the heat exchanger 37 and the cooling water in the cooling vessel 31 is isolated by the heat dissipater 37, it is possible to doubly prevent the primary cooling water having radioactivity from flowing out to the outside of the containment vessel 11.

Description will be made below on operation of the structure that the condensing type heat exchanger 41 filled with a heat medium is arranged in the upper plenum 15 of the pressure suppression pool 14, and the heat dissipater 43 is arranged outside the containment vessel 11, and the condensing type heat exchanger 41 and the heat dissipater 43 are made to communicate with each other through the liquid returning pipe 42 and the gas inflow pipe 44.

The steam flowing out to the drywell 12 at an nuclear reactor accident such as rupture of the main steam pipe 5 or the like is flows from the vent pipes 18 into the pressure suppression pool 14 to be condensed. The latent heat of the steam is transferred to the cooling water of the pressure suppression pool 14 by the condensation to increase temperature of the cooling water and pressure in the upper plenum 15. In order to suppress increase of the pressure in the upper plenum 15, it is necessary to cool the inside of the upper plenum 15 over a long term.

In the heat pipe type containment vessel cooling system in the first embodiment, the steam in the upper plenum 15 is condensed and heat removed using the condensing type heat exchanger 41. The heat medium in the condensing type heat exchanger 41 is heated and vaporized, and flows from the inside of the gas inflow pipe 44 to the heat dissipater 43, and then cooled and condensed by the atmospheric air in natural convection inside the ventilation duct 39 outside the reactor building. The condensed water is circulated to the condensing type heat exchanger 41 through the liquid returning pipe 42.

Thereby, the heat generated in the reactor core 3 transferred to atmospheric air inside the ventilation duct 39 outside the reactor building through the drywell 12, the vent pipes 18, the upper plenum 15, the condensing type heat exchanger 41, the heat dissipater 43, and thus the containment vessel 11 is cooled.

The heat removal described above can be attained using only the piping and the heat exchangers without using any active components such as a pump, a valve and the like, and not limited by an amount of cooling water. Further, long-term cooling can be performed until the accident event is completely settled because the heat dissipation can be permanently continued. Further, since the employed heat transfer modes is vaporization and condensation of the cooling medium and not natural convection heat transfer, the heat transfer is better and accordingly a high heat dissipation efficiency can be obtained. Furthermore, in an event of a single rupture of breaking of a pipe in the condensing type heat exchanger 41 in the upper plenum 15, the coolant inside the containment vessel 11 does not flow out to the outside of the containment vessel. Therefore, the safety and the reliability of the nuclear reactor can be improved. In addition, since the incondensable gas flows into the wetwell 16 to reduce the concentration of the incondensable gas in the upper plenum 15, heat transfer of the condensing type heat exchanger 41 installed in the upper plenum 15 becomes better and accordingly size of the condensing type heat exchanger 41 can be made small.

Description will be made below on operation of the structure that the plurality of gravitationally flow-down water injection pipes 24 having the isolation valve 23 are arranged between the pressure vessel 1 and the pressure suppression pool 14, and the plurality of pressure vessel bottom water flooding pipes 51 are between the pressure suppression pool 14 and the drywell 12, and the upper ends of the gravitationally flow-down water injection pipes 24 and the upper ends of the pressure vessel bottom water flooding pipes 51 are arranged at a level higher than a level of the outlets of the vent pipes 18 in the pressure suppression pool 14.

At a reactor accident such as occurrence of a rupture in the main steam pipe 5, the cooling water in the pressure suppression pool 14 can be injected into the pressure vessel 1 by opening the isolation valve 23 when cooling of the inside of the pressure vessel 1 is progressed and the pressure in the pressure vessel 1 is decreased. Further, when the pressure in the pressure vessel is still high, only the automatic depressurizing valve 21 communicating with the sound main steam pipe 5 without occurrence of pipe rupture is opened, and consequently the steam inside the pressure vessel 1 is injected from the quencher 22 of FIG. 1 into the pressure suppression pool 14 to be condensed. By doing so, when the pressure in the pressure vessel 1 is reduced by releasing the pressure in the pressure vessel outside the pressure vessel, by opening the isolation valve 23 the water stored in the pressure suppression pool 14 is injected into the pressure vessel 1 through the gravitationally flow-down water injection pipes 24 to cool the inside of the pressure vessel. Further, if the isolation valve 23 of the gravitationally flow-down water injection pipe 24 could not be opened and consequently the gravitationally flow-down water injection system could not be operated, the isolation valve 52 of the pressure vessel bottom water flooding pipe 51 would be opened to inject the cooling water in the pressure suppression pool 14 into the lower drywell 13. As the water injection is started, the gas in the lower drywell 13 is blown off into the drywell 12 to fill the lower drywell 13 with the injected cooling water. Thus, the outside of the bottom head of the pressure vessel 1 is emerged under the cooling water to cool the inside of the pressure vessel 1 through heat conduction in the wall of the lower hear.

If the water level of the cooling water in the pressure vessel would be further lowered to expose the reactor core to vapor, or if all the valves could not be operated and the cooling water could not be injected into the pressure vessel 1 and the lower drywell 13 to expose the reactor core to steam, a severe accident that the core would be melted down onto the bottom head of the pressure vessel 1 would result. In such a severe accident, it is important from the viewpoint of safety that the molted core substance should be kept inside the pressure vessel 1.

Description will be made below on operation in the event of occurrence of the severe accident resulting in core meltdown. All the valves can not be operated, the cooling water in the pressure vessel 1 is lost, and the reactor core 3 is melted to drop down onto the bottom head of the pressure vessel 1. Then, the wall temperature of the bottom head of the pressure vessel 1 is increased to open the fuse valve 53 by being melted, the fuse valve 53 being arranged in contact with the outer surface of the bottom head. The cooling water in the pressure suppression pool 14 flows into the lower drywell 13 through the pressure vessel lower portion water flooding pipe 51 to cool the outer surface of the bottom head of the pressure vessel 1.

Thereby, the melted reactor core dropped on the bottom head of the pressure vessel 1 is cooled to prevent break of the pressure vessel. Heat from the melted core is transferred to atmospheric air in natural convection inside the ventilation duct 39 placed outside the reactor building through heat conduction in the bottom head of the pressure vessel 1 and heat transfer to the cooling water in the lower drywell plenum 13; blow-down of the generated steam into the pressure suppression pool 14; the heat exchanger 34 or the condensing type heat exchanger 41; and the heat dissipater 43.

The heat removal described above can be attained using only the piping and the fuse valve without using any active components such as a pump, a valve and the like, and not limited by an amount of cooling water, and the heat dissipation by atmospheric air can be permanently continued. Therefore, long-term cooling can be performed until the severe accident event is completely settled.

According to the first embodiment of the present invention decay heat of the reactor primary system can be removed without using any active components such as a pump and the like and without flowing out the cooling water of the reactor primary system into the containment vessel, it is possible to provide a nuclear reactor which is high in reliability, high in economic feasibility and high in safety.

According to the second embodiment of the present invention pressure in the containment vessel can be decreased at an accident of pipe rupture of the reactor primary system, it is possible to provide a nuclear reactor which is high in safety due to reduction of the pressure and high in economic feasibility capable of optimizing design of the containment vessel.

According to the third embodiment of the present invention the cooling water in the pressure suppression pool can be injected into the pressure vessel without using any active components such as a pump and the like, it is possible to provide a nuclear reactor which is high in safety and in economic feasibility by improving reliability of the safety components and by simplifying the components.

According to the fourth embodiment of the present invention the bottom plenum can be flooded with cooling water and cooled from the outside, it is possible to provide a nuclear reactor which is high in safety by improving reliability of the safety components and by taking the severe accident into consideration, and high in economic feasibility by simplifying the components.

According to the fifth embodiment of the present invention cooling water is injected into the pressure vessel using natural phenomena without using any active components such as a valve and the like and heat generated in the reactor core can be released outside the reactor building, it is possible to provide a nuclear reactor which is high in safety by improving reliability of the safety components for reactor core cooling at occurrence of an accident and by improving the long-term cooling performance.

According to the sixth embodiment of the present invention it is possible to provide a nuclear reactor which is high in safety, in reliability and in economic feasibility.

According to the seventh embodiment of the present invention decay heat of the reactor primary system can be removed without using any active components such as a pump and the like and without flowing out the cooling water of the reactor primary system into the containment vessel, it is possible to provide a nuclear reactor which is high in reliability, high in economic feasibility and high in safety.

According to the eighth embodiment of the present invention, high efficient heat exchange can be performed by condensing and liquid film heat transfer in the primary system and by boiling heat transfer in the secondary system, it is possible to provide a nuclear reactor which is high in economic feasibility.

According to the ninth embodiment of the present invention the output power of the nuclear reactor can be increased by increasing the total heat transfer area of the heat exchanger, it is possible to provide a nuclear reactor which is high in economic feasibility.

According to the tenth embodiment of the present invention the natural circulation flow rate through the reactor core can be increased, it is possible to provide a nuclear reactor which is high in thermal efficiency and in economic feasibility.

According to the eleventh embodiment of the present invention the output power of the nuclear reactor can be increased by increasing the total heat transfer area of the heat exchanger, it is possible to provide a nuclear reactor which is high in economic feasibility.

According to the twelfth embodiment of the present invention the moisture content in the secondary steam can be reduced to improve the thermal efficiency, it is possible to provide a nuclear reactor which is high in economic feasibility.

According to the thirteenth embodiment of the present invention the moisture content in the secondary steam can be further reduced to improve the thermal efficiency, it is possible to provide a nuclear reactor which is high in economic feasibility.

According to the fourteenth embodiment of the present invention the heat transfer performance of the heat exchanger can be improved by steam separation of the primary system cooling water to reduce the moisture content in the secondary steam and accordingly to improve the thermal efficiency, it is possible to provide a nuclear reactor which is high in economic feasibility.

According to the fifteenth embodiment of the present invention occurrence of an event involving loss of primary cooling water can be prevented, and since cooling of the primary cooling water can be continued and loss of the secondary system cooling water can be prevented even at occurring of pipe rupture in the secondary system piping, it is possible to provide a nuclear reactor which is high in safety.

According to the sixteenth embodiment of the present invention, decay heat of the reactor primary system can be removed without using any active components such as a pump and the like and without flowing out the cooling water of the reactor primary system into the containment vessel, it is possible to provide a nuclear reactor which is high in reliability, high in economic feasibility and high in safety.

According to the seventeenth embodiment of the present invention, the heat transfer performance of the heat exchanger can be improved by steam separation of the primary system cooling water to reduce the moisture content in the secondary steam and accordingly to improve the thermal efficiency, it is possible to provide a nuclear reactor which is high in economic feasibility.

What is claimed is:

1. A nuclear reactor, comprising a nuclear fuel reactor core inside a pressure vessel; the pressure vessel having a shroud surrounding said reactor core and a downcomer of an outer region of said shroud; and a containment vessel surrounding said pressure vessel and having a pressure suppression pool, said nuclear reactor being one of a light water reactor and a heavy water reactor, wherein said pressure vessel contains the reactor core and a first heat exchanger for generating secondary steam, an inside of said containment vessel except a region installing said pressure vessel being vertically partitioned into three compartments, the pressure suppression pool having cooling water being formed in the upper compartment, a drywell for placing a feed water pipe of secondary cooling water, a main steam pipe of secondary steam being formed in the middle compartment, a wetwell of pressure suppression space being formed in the lower compartment, said drywell communicating with said pressure suppression pool through a plurality of vent pipes, an upper space of said pressure suppression pool communicating with said wetwell through a plurality of communicating pipes, a heat pipe containment vessel cooling system having a condensing heat exchanger arranged in a space above said pressure suppression pool and a first heat dissipater arranged outside said containment vessel in a position at a level higher than a level of said condensing heat exchanger, an interior of said condensing heat exchanger being filled with a heat medium, a gravitational water injection system being constructed as a plurality of gravitationally flow-down water injection pipes having an isolation valve between said pressure suppression pool and said pressure vessel, a pressure vessel bottom water flooding system being constructed as a plurality of pressure vessel bottom water flooding pipes between said pressure suppression pool and a lower portion of said drywell, an upper end of said gravitationally flow-down water injection pipe being arranged at a level higher than an upper end of said bottom, an upper end of said pressure vessel bottom water flooding pipe being arranged at a level higher than an upper end of said bottom, a lower portion of said pressure vessel bottom water flooding pipe being branched to a plurality of systems, at least one of said plurality of systems being connected to a fuse valve arranged in contact with an outer surface of a bottom portion of said pressure vessel, at least one other of said plurality of systems being opened to a lower space of said drywell through an isolation valve, a reactor core isolation cooling system being constructed as a cooling vessel and a second heat dissipater, said cooling vessel being filled with a coolant and containing a second heat exchanger in said coolant, said cooling vessel being arranged at a level higher than said reactor core inside said containment vessel, said second heat exchanger being connected to said pressure vessel using an inflow pipe and a water injection pipe, a lower end of said inflow pipe and a lower end of said water injection pipe being opened to said pressure vessel at a level lower than a water surface level in said pressure vessel during operation of said nuclear reactor, said second heat dissipater being arranged outside said containment vessel at a level higher than said cooling vessel, an upper end of said cooling vessel communicating with a cooler through a gas inflow pipe, said cooler communicating with said cooling vessel through a liquid returning pipe.

2. A nuclear reactor according to claim 1, wherein at least one heat exchanger system arranged inside said pressure vessel, said at least one heat exchanger system being heated by primary cooling water recirculating through said reactor core to generate steam to be supplied to a turbine or a heat supply system, a secondary steam passage of said at least one heat exchanger system being branched to communicate with a portion under water of a pressure suppression pool arranged inside said containment vessel through an isolation valve, a secondary cooling water passage of said at least one heat exchanger system being branched to communicate with a portion under the water of said pressure suppression pool inside said containment vessel through an isolation valve, decay heat generated by said reactor core during reactor core isolation being heat exchanged by said at least one heat exchanger system to condense steam generated by the decay heat under the water of said pressure suppression pool and at the same time to supply the water of said pressure suppression pool to said at least one heat exchanger system.

3. A nuclear reactor according to claim 1, wherein at least one heat exchanger system arranged inside said pressure vessel, said at least one heat exchanger system being heated by primary cooling water recirculating through said reactor core to generate steam to be supplied to a turbine or a heat supply system, a third heat exchanger being arranged under water of a pressure suppression pool inside said containment vessel, a secondary steam passage of said at least one heat exchanger system in said pressure vessel being branched to communicate with said third heat exchanger under the water of a pressure suppression pool through an isolation valve, a secondary cooling water passage of said at least one heat exchanger system in said pressure vessel being branched to communicate with said third heat exchanger under the water of the pressure suppression pool through an isolation valve, decay heat generated by said reactor core during reactor core isolation being heat exchanged by said at least one heat exchanger system in said pressure vessel to condense steam generated by the decay heat using said third heat exchanger under the water of said pressure suppression pool and at the same time to supply the condensed water to said at least one heat exchanger system in said pressure vessel.

4. A nuclear reactor, comprising:
a pressure vessel having a shroud surrounding a nuclear fuel reactor core inside the pressure vessel and a downcomer of an outer region of said shroud; and
a containment vessel surrounding said pressure vessel and having a pressure suppression pool, said nuclear reactor being a light water reactor or a heavy water reactor;
a heat pipe containment vessel cooling system having a condensing heat exchanger arranged in a space above said pressure suppression pool, wherein an inside of said condensing heat exchanger is filled with a heat medium; and
a heat dissipater arranged outside said containment vessel in a position at a level higher than a level of said condensing heat exchanger, said heat dissipater communicating with said condensing heat exchanger through a gas inflow pipe and a liquid returning pipe to form a closed loop for the heat medium.

5. A nuclear reactor, comprising:
a nuclear fuel reactor core inside a pressure vessel, the pressure vessel having a shroud surrounding said reactor core and a downcomer of an outer region of said shroud;
a containment vessel surrounding said pressure vessel and having a pressure suppression pool, said nuclear reactor being a light water reactor or a heavy water reactor,
wherein an inside of said containment vessel except a region installing said pressure vessel is vertically partitioned into three compartments,
a pressure suppression pool having cooling water being formed in the upper compartment,
a drywell for placing a feed water pipe of secondary cooling water and a main steam pipe of secondary steam being formed in the middle compartment,
a wetwell of a pressure suppression space being formed in the lower compartment,
said drywell communicating with said pressure suppression pool through a plurality of vent pipes, an upper space of said pressure suppression pool communicating with said wetwell through a plurality of communicating pipes.

6. A nuclear reactor, comprising:
a nuclear fuel reactor core inside a pressure vessel, the pressure vessel having a shroud surrounding said reactor core and a downcomer of an outer region of said shroud;

a containment vessel surrounding said pressure vessel and having a pressure suppression pool, said nuclear reactor being one of a light water reactor and a heavy water reactor, wherein a pressure vessel bottom water flooding system is comprised of a pressure vessel bottom water flood pipe, a lower portion of the pressure vessel bottom water flooding pipe is branched to a plurality of systems, and at least one of said plurality of systems is connected to a fuse valve arranged in contact with an outer surface of a bottom portion of said pressure vessel, and at least the other one of said plurality of systems is opened to a lower space of said drywell through an isolation valve.

* * * * *